(12) United States Patent  
Hornsby et al.

(10) Patent No.: US 11,164,491 B2
(45) Date of Patent: Nov. 2, 2021

(54) ROOF MOUNTED VEHICLE TOPPER

(71) Applicant: Manufacturing Resources International, Inc., Alpharetta, GA (US)

(72) Inventors: Eric Hornsby, Alpharetta, GA (US); William Dunn, Alpharetta, GA (US); Mike Brown, Cumming, GA (US); Doug Bennett, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 171 days.

(21) Appl. No.: 16/593,543

(22) Filed: Oct. 4, 2019

(65) Prior Publication Data

US 2020/0039450 A1 Feb. 6, 2020

Related U.S. Application Data

(63) Continuation of application No. 15/934,074, filed on Mar. 23, 2018, now Pat. No. 10,486,618.

(60) Provisional application No. 62/476,385, filed on Mar. 24, 2017, provisional application No. 62/571,631, filed on Oct. 12, 2017.

(51) Int. Cl.
| | |
|---|---|
| *G09F 21/04* | (2006.01) |
| *B60R 13/00* | (2006.01) |
| *B60R 11/02* | (2006.01) |
| *B60R 16/033* | (2006.01) |
| *G09F 9/00* | (2006.01) |
| *B60R 11/00* | (2006.01) |

(52) U.S. Cl.
CPC ........ *G09F 21/042* (2020.05); *B60R 11/0235* (2013.01); *B60R 13/00* (2013.01);
(Continued)

(58) Field of Classification Search
CPC ... B60R 13/00; B60R 11/0235; B60R 16/033; B60R 2011/004; G09F 21/04
See application file for complete search history.

(56) References Cited

U.S. PATENT DOCUMENTS 3,141,588 A * 7/1964 McMiller ............... B60R 9/058
224/331
3,525,461 A * 8/1970 Bronson ............... G09F 21/042
224/315
(Continued)

FOREIGN PATENT DOCUMENTS

AU 201815719 10/2018
AU 201815720 10/2018
(Continued)

OTHER PUBLICATIONS

Adnation, Miller photos, May 9, 2017, 28 pages.
(Continued)

*Primary Examiner* — Gary C Hoge
(74) *Attorney, Agent, or Firm* — Standley Law Group LLP; Jeffrey S. Standley; Adam J. Smith

(57) ABSTRACT

A cross bar for mounting a vehicle topper to a roof of a vehicle is provided. A center section has a rectangular cross section, a first end, and a second end. A first tapered section extends from the first end of the center section. A second tapered section extends from the second end of the center section. A longitudinal axis of the center section, the first tapered section, and the second tapered section extend primarily in the same direction.

20 Claims, 22 Drawing Sheets

(52) U.S. Cl.
CPC ............ *B60R 16/033* (2013.01); *G09F 21/04* (2013.01); *B60R 2011/004* (2013.01); *G09F 9/00* (2013.01)

(56) References Cited

U.S. PATENT DOCUMENTS

| | | |
|---|---|---|
| 3,978,599 A | 9/1976 | Berger |
| 4,052,806 A | 10/1977 | George |
| 4,114,789 A | 9/1978 | Blaylock et al. |
| 4,261,496 A * | 4/1981 | Mareydt .............. B60R 9/12 16/330 |
| 4,449,656 A | 5/1984 | Wouden |
| 4,500,020 A | 2/1985 | Rasor |
| 4,534,496 A | 8/1985 | Bott |
| 4,640,450 A | 2/1987 | Gallion et al. |
| 4,671,004 A | 6/1987 | Berg |
| D294,137 S | 2/1988 | Robson |
| D296,087 S | 6/1988 | Luck |
| 4,768,691 A | 9/1988 | Stapleton |
| 4,778,092 A | 10/1988 | Grace |
| D306,990 S | 4/1990 | Bott |
| 4,972,983 A | 11/1990 | Bott |
| 4,982,886 A | 1/1991 | Cucheran |
| D314,983 S | 2/1991 | Cangianni et al. |
| 4,993,615 A | 2/1991 | Arvidsson |
| 5,016,798 A | 5/1991 | Stapleton et al. |
| 5,038,988 A | 8/1991 | Thulin |
| D320,971 S | 10/1991 | Sparham et al. |
| 5,104,020 A | 4/1992 | Arvidsson et al. |
| D326,282 S | 5/1992 | Spoljaric |
| 5,132,666 A | 7/1992 | Fahs |
| 5,170,920 A | 12/1992 | Corrente et al. |
| 5,171,083 A | 12/1992 | Rich |
| 5,207,365 A | 5/1993 | Bott |
| 5,257,710 A * | 11/1993 | Cropley .............. B60R 9/058 224/322 |
| 5,306,156 A * | 4/1994 | Gibbs .............. B60Q 1/302 439/34 |
| 5,347,736 A | 9/1994 | Kanigan |
| 5,385,285 A | 1/1995 | Cucheran et al. |
| 5,474,218 A | 12/1995 | Arsenault, Jr. et al. |
| 5,560,525 A | 10/1996 | Grohmann et al. |
| D398,409 S | 9/1998 | Jessa |
| 5,826,766 A | 10/1998 | Aftanas |
| 5,871,190 A | 2/1999 | Henriksson |
| 5,979,723 A | 11/1999 | Tress et al. |
| 6,050,467 A | 4/2000 | Drouillard et al. |
| D430,901 S | 9/2000 | Palmer |
| 6,114,954 A | 9/2000 | Palett et al. |
| 6,116,486 A | 9/2000 | Lindell |
| 6,378,747 B1 | 4/2002 | Fisch et al. |
| 6,415,970 B1 | 7/2002 | Kmita et al. |
| 6,701,143 B1 | 3/2004 | Dukach et al. |
| 6,812,851 B1 | 11/2004 | Dukach et al. |
| 6,850,209 B2 | 2/2005 | Mankins et al. |
| 7,134,764 B1 | 11/2006 | Bieberdorf |
| 7,434,713 B2 | 10/2008 | Linden |
| D634,722 S | 3/2011 | Kim et al. |
| D635,614 S | 4/2011 | Yan |
| D639,340 S | 6/2011 | Martin |
| D647,970 S | 11/2011 | Strempack |
| 8,122,628 B2 | 2/2012 | Johnson, Jr. |
| D657,421 S | 4/2012 | Yan |
| D657,422 S | 4/2012 | Yan |
| D669,938 S | 10/2012 | Lard et al. |
| 8,534,516 B1 | 9/2013 | Vo |
| D694,170 S | 11/2013 | Eriksson |
| D704,265 S | 5/2014 | Yan |
| 9,135,839 B2 | 9/2015 | Remenda |
| D740,472 S | 10/2015 | Linton et al. |
| D763,357 S | 8/2016 | Tsuru et al. |
| D765,660 S | 9/2016 | Kim et al. |
| D775,989 S | 1/2017 | Kalanick et al. |
| D777,258 S | 1/2017 | Strempack et al. |
| D792,833 S | 7/2017 | Chan |
| D793,890 S | 8/2017 | Hong |
| D815,690 S | 4/2018 | Squillante |
| 9,994,160 B2 | 6/2018 | Kim et al. |
| D848,528 S | 5/2019 | Lee et al. |
| D848,529 S | 5/2019 | Lee et al. |
| 10,326,962 B2 | 6/2019 | Hamilton |
| 2002/0009978 A1 | 1/2002 | Dukach et al. |
| 2002/0065046 A1 | 5/2002 | Mankins et al. |
| 2002/0084891 A1 | 7/2002 | Mankins et al. |
| 2002/0112026 A1 | 8/2002 | Fridman et al. |
| 2002/0159270 A1 | 10/2002 | Lynam et al. |
| 2002/0164962 A1 | 11/2002 | Mankins et al. |
| 2003/0119448 A1 | 6/2003 | Arntz |
| 2004/0004827 A1 | 1/2004 | Guest |
| 2004/0036622 A1 | 2/2004 | Dukach et al. |
| 2004/0170013 A1 | 9/2004 | Smythe |
| 2004/0182898 A1 | 9/2004 | Harris |
| 2005/0051684 A1 * | 3/2005 | Linden .............. B60R 9/058 248/188.4 |
| 2005/0116511 A1 | 6/2005 | Leroy et al. |
| 2006/0091170 A1 | 5/2006 | Almhil |
| 2007/0108243 A1 | 5/2007 | Bingham |
| 2007/0158965 A1 | 7/2007 | Van Smirren |
| 2007/0252409 A1 | 11/2007 | Clinton et al. |
| 2008/0083800 A1 * | 4/2008 | Mathew .............. B60R 9/058 224/326 |
| 2008/0236007 A1 * | 10/2008 | Au .............. B60Q 1/503 40/592 |
| 2010/0282799 A1 | 11/2010 | Hubbard |
| 2011/0072697 A1 | 3/2011 | Miller |
| 2011/0132946 A1 | 6/2011 | Sautter et al. |
| 2011/0315726 A1 | 12/2011 | Huhn et al. |
| 2012/0002357 A1 | 1/2012 | Auld et al. |
| 2012/0312848 A1 | 12/2012 | Delusky et al. |
| 2013/0173358 A1 | 7/2013 | Pinkus |
| 2015/0122857 A1 * | 5/2015 | Ferman .............. B60R 9/058 224/309 |
| 2015/0129625 A1 | 5/2015 | Gorey et al. |
| 2015/0175082 A1 | 6/2015 | Aftanas et al. |
| 2015/0232038 A1 | 8/2015 | Robertson |
| 2015/0274084 A1 | 10/2015 | Sarges et al. |
| 2015/0369274 A1 | 12/2015 | Stojkovic et al. |
| 2017/0029043 A1 | 2/2017 | Clark et al. |
| 2017/0050576 A1 | 2/2017 | Ferman |
| 2017/0132960 A1 | 5/2017 | Kis-Benedek Pinero et al. |
| 2017/0257978 A1 | 9/2017 | Diaz |
| 2018/0170270 A1 | 6/2018 | Bergman |
| 2018/0172239 A1 | 6/2018 | Wacker et al. |
| 2018/0272959 A1 | 9/2018 | Hornsby et al. |
| 2020/0148126 A1 | 5/2020 | Griffith et al. |

FOREIGN PATENT DOCUMENTS

| | | |
|---|---|---|
| AU | 201815721 | 10/2018 |
| CN | 106782121 A | 5/2017 |
| CN | 109961695 A | 7/2019 |
| DE | 202007017477 U1 | 6/2008 |
| EM | 005638509-0001 | 9/2018 |
| EM | 005638541-0001 | 9/2018 |
| EM | 005638558-0001 | 9/2018 |
| EP | 0476288 A1 | 3/1992 |
| JP | 8-216779 A | 8/1996 |
| JP | 2001-151027 A | 6/2001 |
| JP | 3094183 U | 3/2003 |
| JP | 1634158 S | 5/2019 |
| JP | 1634159 S | 5/2019 |
| KR | 10-2004-0039823 A | 5/2004 |
| KR | 10-0917344 B1 | 9/2009 |
| WO | 2018/175888 A1 | 9/2018 |

OTHER PUBLICATIONS

LG-MRI, BoldVu Vehicle Top Displays, via Internet Archive Wayback Machine at URL: https://web.archive.org/web/20190327001140/https://lg-mri.com/digital-taxi-top-display/, Mar. 27, 2019, 8 pages.

McGarrybowen, Inside the Campaign: United Airlines "Real Time Taxi", https://www.aaaa.org/inside-campaign-united-airlines-real-

(56) References Cited

OTHER PUBLICATIONS time-taxi-mcgarrybowen-media-partners-kinetic-mec-verifone/, Jul. 7, 2017, 6 pages, American Association of Advertising Agencies.

Rave, DSE 2017: LG-MRI Presents TaxiVu, a Digital LCD Display for Mobile Advertising, video at https://www.youtube.com/watch?v=CmNw40BT6ZE, Mar. 30, 2017, 1 page.

Rave, DSE 2018: LG-MRI Highlights BoldVu Vehicle Top Display, VT1145LD, for DOOH Advertising, video at https://vww.youtube.com/watch?v=IYSMhCnMyhg, Apr. 1, 2018, 1 page.

Adnation, Turn Key Solutions, May 23, 2017, 4 pages.

Alie Express, P5 LED taxi top led display, wireless P5 car roof advertising led sign 960mm x 320mm two sides, webpage, accessed Apr. 8, 2021, 13 pages.

Gizmodo, Uber Will Puts Ads on Top of Vehicles Just Like Old-School Taxis, Feb. 24, 2020, 4 pages.

The Street, Lyft Acquires Halo Cars, a Startup That Places Ads on Vehicles, Feb. 21, 2020, 2 pages.

Marketingdive, Puma brings targeted hologram ads to car roofs for NBA All-Star game, Feb. 20, 2020, 3 pages.

Deploy Solution, Melford Technologies homepage, Mar. 3, 2020, 4 pages.

Commercial Integrator, WaiveCar Brings Car Sharing and Digital Signage Together with Help from BrightSign, Jul. 6, 2018, 9 pages.

\* cited by examiner

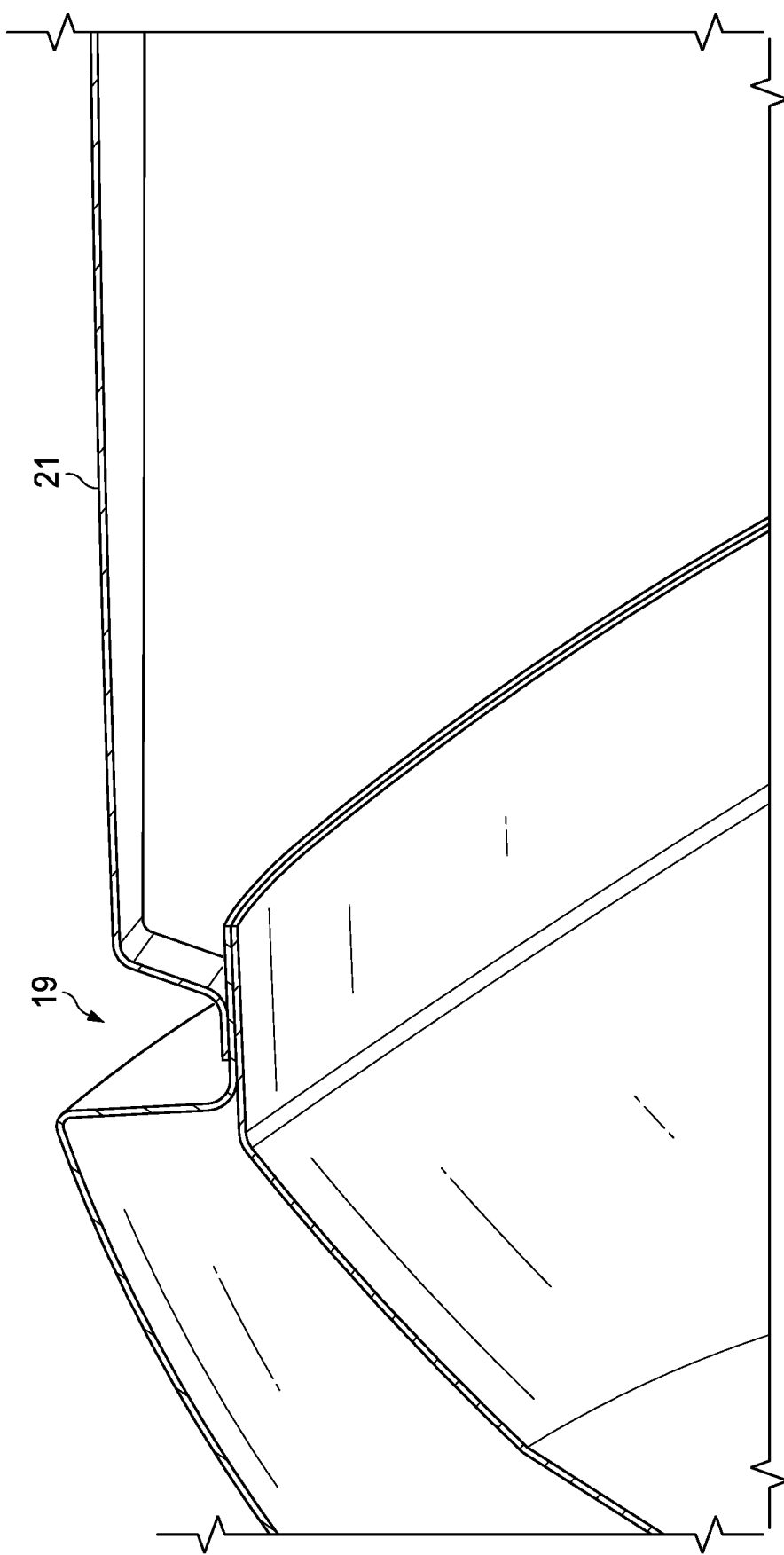

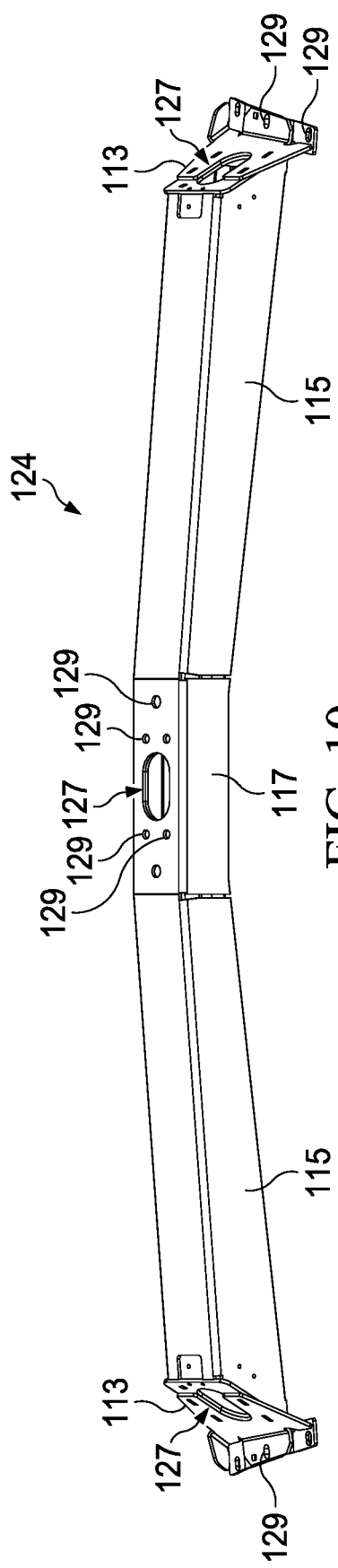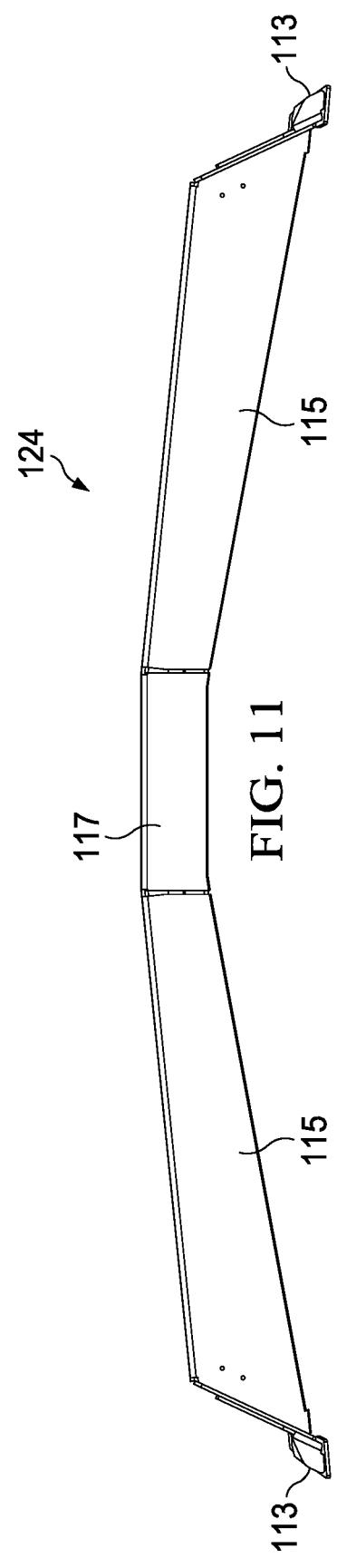

ROOF MOUNTED VEHICLE TOPPER

CROSS-REFERENCE TO RELATED APPLICATION

This application is a continuation of U.S. application Ser. No. 15/934,074 filed Mar. 23, 2018, which claims the benefit of U.S. Provisional Application No. 62/476,385 filed Mar. 24, 2017 and U.S. Provisional Application No. 62/571,631 filed Oct. 12, 2017, the disclosures of all of which are hereby incorporated by reference in their entireties.

TECHNICAL FIELD

Exemplary embodiments of the present invention relate generally to a roof mounted vehicle topper.

BACKGROUND AND SUMMARY OF THE INVENTION

Vehicle toppers are sometimes used to display information and advertising on the otherwise vacant roof of a vehicle. For many years, these vehicle toppers displayed static images. In recent years, electronic displays have replaced traditional, static displays. The use of electronic displays allows content to be quickly and easily changed and permits the use of videos and interactive graphics, among other benefits. However, these electronic displays often require additional equipment, making them heavier than their traditional counterparts. Further, the market has begun demanding increasingly larger displays, which requires increasingly larger (and generally heavier) vehicle toppers. Those of skill in the arts of placing displays on the roofs of vehicles have believed that it was necessary to provide vehicles carrying such electronic displays with drastic, enhanced internal structural supports to enable a relatively heavy and large electronic display to be mounted to the roof of the vehicle in a secure manner. Theses enhanced internal structural supports require significant effort and costs to install. Additionally, such modifications typically require significant effort to remove and leave lasting changes to the vehicle, if removal is even possible. As an example, but not to serve as a limitation, one may wish to remove the display so that one can resell a vehicle and/or place the display on a different vehicle.

With the rise of private transportation service companies such as Uber and Lyft, personal vehicles are increasingly being used for paid transportation services alongside more traditional services such as public transportation, taxis, town cars, and limousines. Such private or commercial drivers, or any other owner of a personal or commercial vehicle, could benefit from being able to display advertisements and other information on a vehicle topper that is capable of being mounted to a personal or commercial vehicle without the need for extensive modification. Such a vehicle topper can be used to display information and advertising for a multitude of purposes, including but not limited to, generating additional revenue for the vehicle owner or driver. Therefore, what is needed is a roof mounting apparatus and system for a vehicle topper having an electronic display.

Roof mounted objects, such as but not limited to vehicle toppers, often experience vibrational forces. Such forces may be caused by traveling over bumpy, rough surfaces, or uneven road surfaces, aerodynamic forces, and/or the vehicle itself (e.g., engine vibrations). Such vibrational forces may be translated through the frame and other components of the vehicle to the vehicle topper. Exposure to prolonged or excessive vibrational forces may cause the damage to the vehicle topper or even cause the vehicle topper to become dislodged. Vehicle toppers are likely to experience a number of forces when the vehicle is in operation. In order to stably mount the vehicle topper unit to the vehicle, enhanced strength mounting components are needed. Additionally, components which dampen or otherwise attenuate the transfer of vibrational forces are desirable. Therefore, what is needed is roof mounting apparatus and system for a vehicle topper having an electronic display, where said roof mounting apparatus and system dampens or otherwise attenuates vibrational forces and has enhanced strength mounting components.

The present invention is a roof mounting apparatus and system for a vehicle topper having an electronic display, where said roof mounting apparatus and system dampens or otherwise attenuates vibrational forces and has enhanced strength mounting components. The vehicle topper may comprise a pair of displays placed back to back. The vehicle topper may have a mounting device for securing the vehicle topper to a pair of cross bars. The cross bars may be attached to a set of base units located at substantially the four corners of the vehicle roof. The front pair of base units may be located near the A pillar while the rear pair of base units may be located near the C pillar.

Each base unit may be mounted to the roof by a pair of threaded fasteners that extends through the cross bars and the base units and into rivet nuts placed in the roof, such as in the rain ditch. The threaded fasteners and rivet nuts may provide a substantially watertight seal. The bottom surface of the base units may be configured to match the pitch of the roof for each model and make of car such that the bottom edge of the vehicle topper, when mounted, is located substantially parallel with the ground and approximately $\frac{1}{4}^{th}$ inch above the crown point of the roof. Wiring may extend from a power source, the other electronic components for operating the vehicle topper, and the vehicle's computer system, each of which may be located in the trunk or beneath the hood of the vehicle, to the vehicle topper. The wiring may travel through or along the A, B, or C pillars, the base units, the cross bars, and to or into the vehicle topper.

The cross bars may be comprised of sufficiently strong materials and of be of sufficient thickness to adequately support the vehicle topper. The cross bars may comprise a varying cross section. The varying cross section may cause the cross bar to have different natural or resonant frequencies at different locations, as the cross section may affect the cross bar's natural or resonant frequency. In exemplary embodiments, the cross bars may taper from the outer edges towards the center. A center section of the cross bay may have a consistent cross section. The center section may be utilized for attaching the vehicle topper to the cross bar. The cross bars may be configured to receive wiring, which may extend therethrough. The cross bars may additionally be configured to receive caps on the outer ends thereof to improve appearance and aerodynamics.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3A is a front sectional view of an exemplary vehicle shown without the roof mounting apparatus or vehicle topper;

FIG. 10 is a top perspective view of an exemplary cross bar in accordance with FIG. 7 shown in isolation to illustrate additional features of the cross bar;

FIG. 11 is a front view of the cross bar of FIG. 10;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1A:
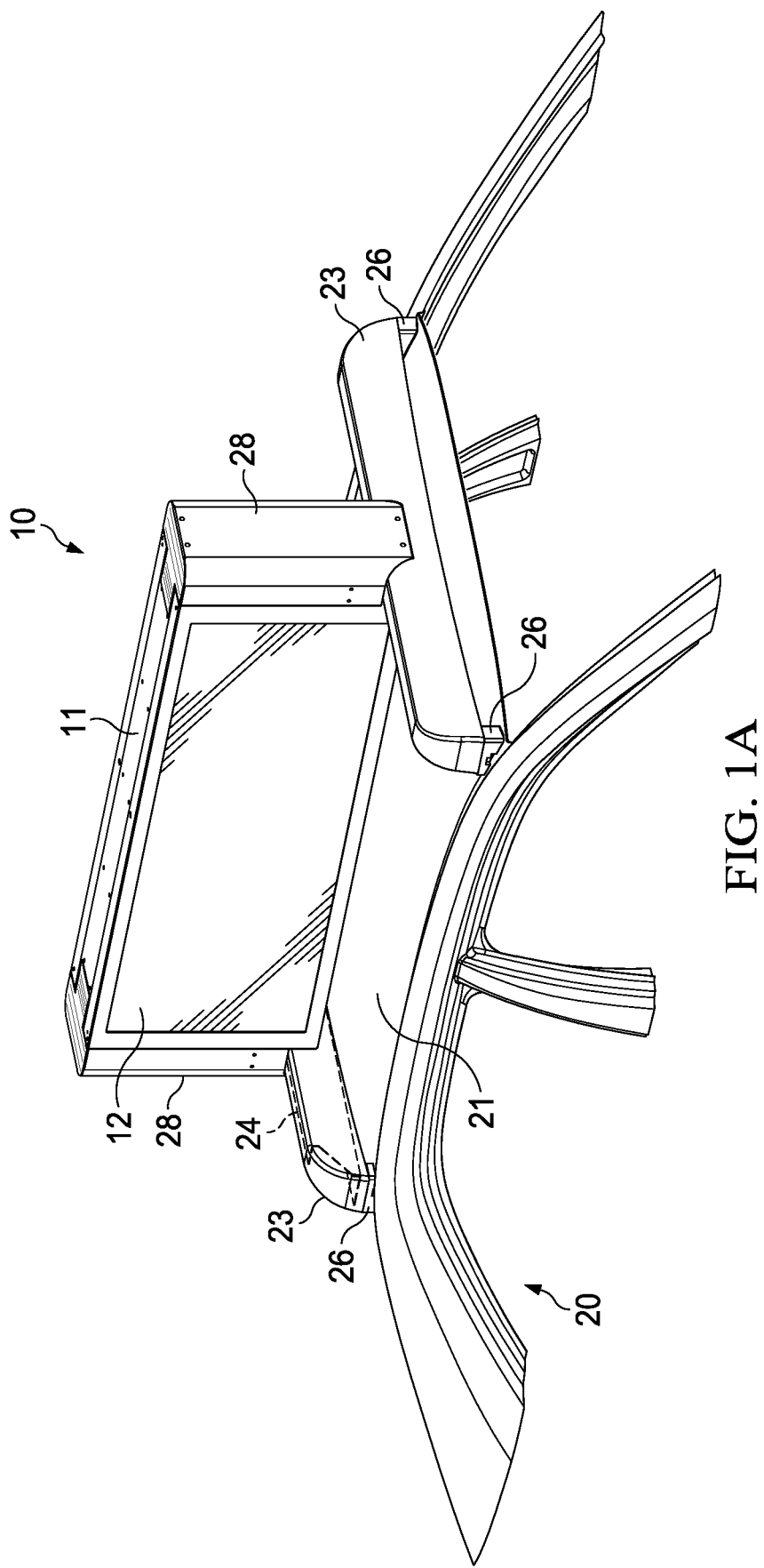
FIG. 1A is a front perspective view of an exemplary vehicle topper and roof mounting apparatus mounted to the roof of a vehicle.
Figure 1B:
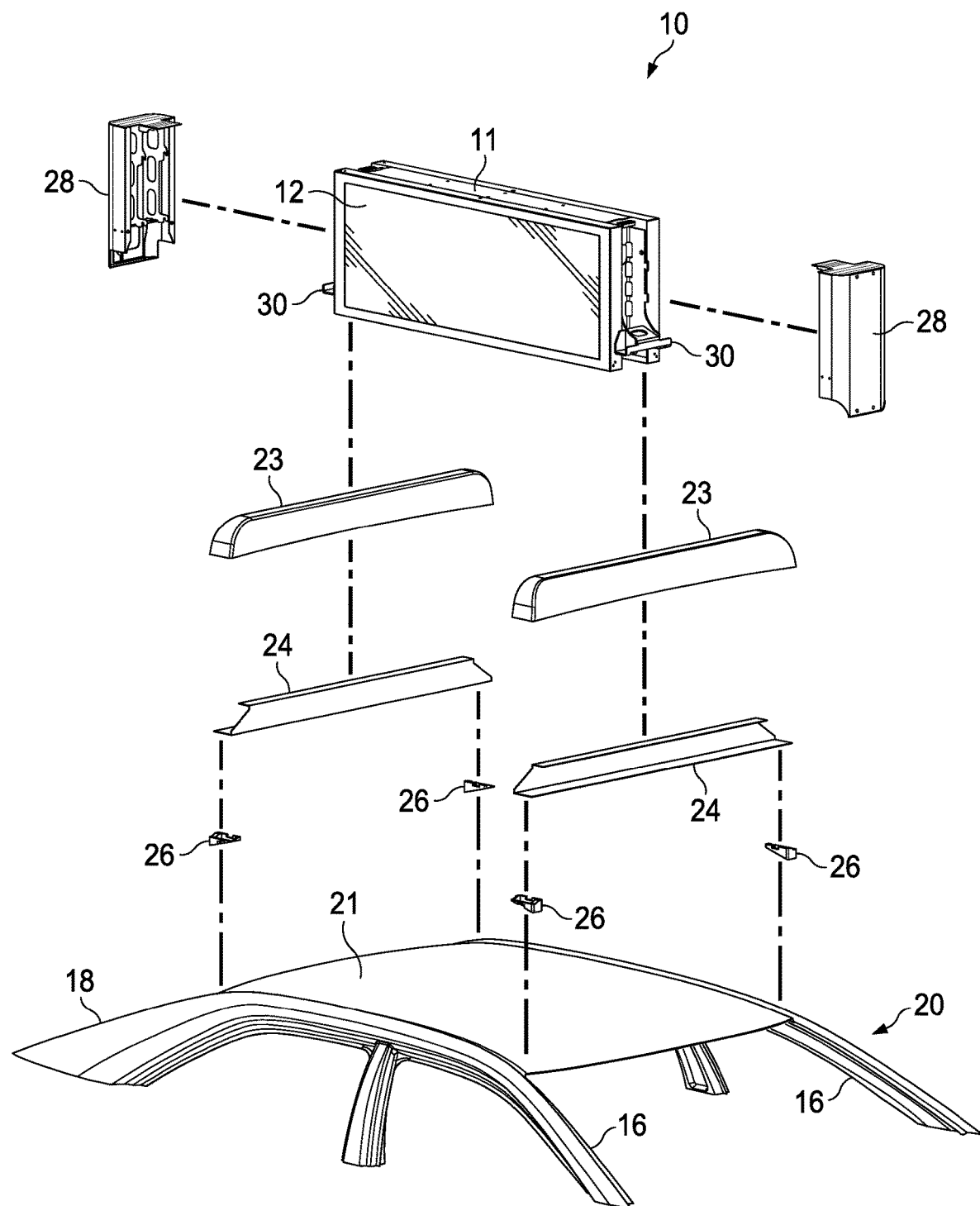
FIG. 1B is an exploded view of the device of FIG. 1A.

FIG. 1A and FIG. 1B illustrate an exemplary mounting apparatus for mounting an exemplary vehicle topper 10 to a roof 21 of a vehicle 20. A number of base units 26 may be located on the roof 21. A pair of cross bars 24 may extend across the roof 21, each between two of the base units 26. The cross bars 24 may be comprised of tube steel and may comprise a substantially square, rectangular, or tubular cross section, though any shape is contemplated. In other exemplary embodiments, the cross bars 24 may be formed by folding sheet metal into a substantially C-shaped bar, though any manufacturing process is contemplated. As further described herein, in other exemplary embodiments, the cross bars 24 may comprise a varying cross section. The cross bars 24 may be comprised of a metal or a blend of metals, though any material is contemplated.

A first and second cross bar fascia 23 may be attached to each of the cross bars 24. Each cross bar fascia 23 may cover a portion or substantially all of the respective cross bar 24. The cross bar fascia 23 may provide an aesthetically pleasing look as well as improved aerodynamics. As an example, but not to serve as a limitation, the cross bar fascia 23 may be shaped to substantially match the curve of the roof 21. The cross bar fascia 23 may be comprised of plastic, though any type of material is contemplated. In exemplary embodiments where a substantially C-shaped cross bar 24 is utilized, the cross bar fascia 23 may additionally enclose the otherwise open end of the C.

The base units 26 may be configured to be located near each corner of the roof 21. In this way, the first cross bar 24 may extend between the pair of base units 26 mounted near the front of the roof 21 and the second cross bar 24 may extend between the pair of base units 26 mounted near the rear of the roof 21. In exemplary embodiments, the front pair of base units 26 may be placed substantially directly over, or otherwise in close proximity with, the A pillar 16 of the vehicle 20, while the rear pair of base units 26 may be placed substantially directly over, or otherwise in close proximity with, the C pillar 18 of the vehicle 20. This arrangement may assist with decreasing or distributing shock, stress, strain, vibrations, and other forces on the vehicle topper 10 and the roof mounting apparatus.

The base units 26 may be any size or shape and may be configured to be attached to the roof 21. For example, but not to serve as a limitation, the bottom of the base units 26 may be sized and shaped to substantially match the pitch of the roof 21 in the location the base units 26 are to be mounted. The base units 26 may be the same size, shape, and configuration for many or all types of vehicles 20. In other exemplary embodiments, however, the base units 26 are sized, shaped, and configured to fit a particular make and model of vehicle. Each base unit 26 (e.g., the front left, front right, rear right, and rear left) may be differently sized, shaped, and configured or they all may be substantially the same. In exemplary embodiments, the front left and front right base units 26 are substantially identical while the rear left and rear right base units 26 are likewise substantially identical.

The vehicle topper 10 may comprise one or more electronic displays 12. In exemplary embodiments, the vehicle topper 10 comprises a pair of electronic displays 12 placed back-to-back within a housing 11. The components used to operate and maintain the electronic displays 12 may be mounted between, or on the posterior surface of, the electronic displays 12. Such components may include, but are not limited to, electronic storage devices, processors, input/output devices, TCON, video players, other electronic components, fans, thermoelectric units, thermal plates, heat exchangers, cooling channels, plenums, air pathways, other cooling systems, wireless transmitters and receivers, cellular network devices, other communications equipment, GPS, other location detection equipment, temperature sensors, ambient light sensors, air quality sensors, accelerometers, strain sensors, other sensors, cameras, video and imaging capturing equipment, microphone and other audio capturing equipment, speakers, and the like.

In exemplary embodiments, the housing 11 is the same size regardless of the make or model of the vehicle 20 and the housing 11 may be sized to comply with the city ordinances of all cities or a selection of cities. In such embodiments, a standard size display 12 may be used across many vehicle toppers 10. However, in other exemplary embodiments, the housing 11 may be various sizes to accommodate various make and model vehicles 20 as well as various size displays 12.

The vehicle topper 10 may mounted to the cross bars 24 by way of a mounting device 30 located on the vehicle topper 10. In exemplary embodiments, the mounting device 30 may be a pair of brackets that each extend substantially parallel with the ground from the front and the rear ends of the vehicle topper 10. The mounting device 30 may be positioned such that when the vehicle topper 10 is mounted to the roof 21, the bottom edge of the vehicle topper 10 rests a distance from the crown point of the roof 21. For example, but not to serve as a limitation, there may be substantially a ¼ inch gap between the crown and the bottom edge of the vehicle topper 10, though any size gap (or no gap) is contemplated. In this way, the bottom edge of the vehicle topper 10 may rest near the roof 21 of the vehicle 20, thus permitting the vehicle topper 10 to maintain a low profile, which may provide enhanced stability, safety, and aerodynamics as well as providing a more aesthetically pleasing look. Regardless, the mounting device 30 may extend over the top of or surround a portion (or all) of the cross bars 24 and may be attached or bonded thereto such as, but not limited to, through the use of fasteners, bolts, screws, nails, adhesive, welding, or the like. In other exemplary embodiments, the mounting device 30 may comprise a protrusion that interacts with a corresponding groove in the cross bars 24. Any attachment mechanism is contemplated.

A pair of end cap fascia 28 may be configured to be secured to the front and rear of the vehicle topper 10, respectively. The end cap fascia 28 may cover a portion or the entirety of the respective end of the vehicle topper 10 and may also cover at least a portion of the mounting device 30. The end cap fascia 28 may protect the interior of the vehicle topper 10 as well as provide an aesthetically pleasing look and improved aerodynamics. The end cap fascia 28 may be configured to abut or extend atop a portion of the cross bar fascia 23 to present a seamless, unified, or otherwise aesthetically pleasing appearance that may also improve aerodynamics.

The roof mounting apparatus and its various components may be configured to place the bottom edge of the vehicle topper 10 substantially parallel with the ground. Oftentimes, certain vehicles 20 are configured to tilt slightly upwards or downwards when the vehicle 20 is empty of all passengers and cargo. In such cases, the roof mounting apparatus and system as well as its various components may be configured to compensate for said tilt such that the bottom edge of the vehicle topper 10 is mounted substantially parallel with the ground when the vehicle 20 is empty. Alternatively, the roof mounting apparatus and system as well as its various components may be configured to compensate for said tilt such that the bottom edge of the vehicle topper 10 is mounted substantially parallel with the ground when the vehicle 20 is carrying an average load or is substantially fully loaded. This arrangement may reduce shock, stress, strain, vibrations, and other forces placed on the vehicle mounting apparatus, its various components, and the vehicle topper 10 as well as improve overall ride performance of the vehicle 20.

Figure 2A:
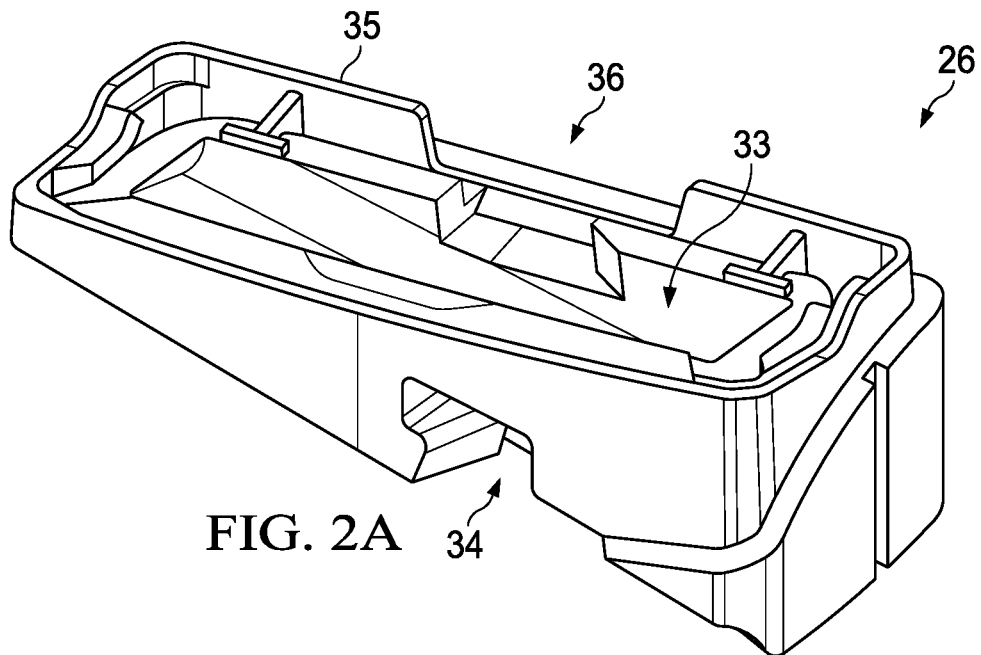
FIG. 2A is a detailed front perspective view of an exemplary base unit shown in isolation so as to illustrate additional features of the base unit.
Figure 2B:
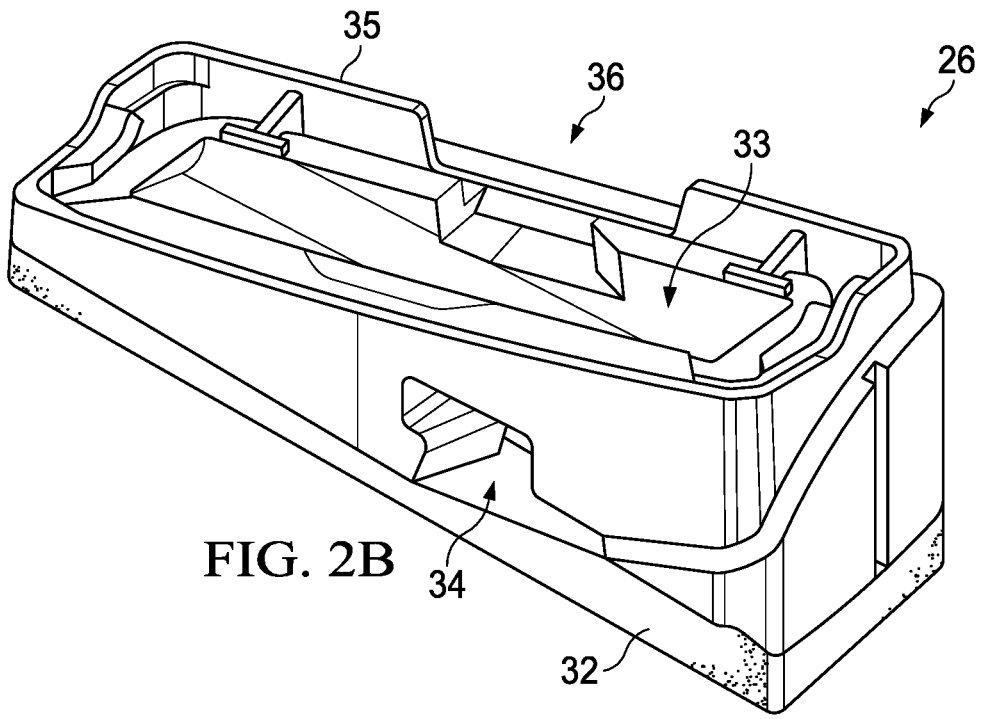
FIG. 2B is a detailed front perspective view of another exemplary base unit shown in isolation so as to illustrate additional features of the base unit.

FIG. 2A and FIG. 2B illustrate detailed views of an exemplary embodiment of the base units 26 shown in isolation to illustrate additional features of the base units 26. The base units 26 may be comprised of rubber, plastic, metal, or the like. The base units 26 may define an aperture 33 that passes completely through the base unit 26. As will be explained in greater detail, the aperture 33 may be any size or shape and may be located anywhere on the base unit 26. In exemplary embodiments, the aperture 33 is configured to receive a fastener 37 and electrical wiring 44. The base units 26 may further comprise an exterior side channel 34 and an interior side channel 36. As will be described in greater detail herein, the exterior side channel 34 may be configured to receive the electrical wiring 44, which passes through the base unit 26 and may exits via the interior side channel 36. The exterior side channel 34 may be located on the side of the base unit 26 facing the outside of the vehicle 20 while the interior side channel may be located on the side of the base unit 26 facing the interior of the vehicle 20. In exemplary embodiments, the exterior side channel 34 is located along or near the bottom edge of the base unit 26 and the interior side channel 36 is located along or near the upper edge of the base unit 26.

As previously discussed, the bottom edge of the base unit 26 may be configured to substantially match the pitch of the roof 21 and be mounted thereto. The upper edge of the base unit 26 may be configured to receive the cross bars 24, which may be mounted thereto. In exemplary embodiments, the upper edge of the base unit 26 comprises a lip 35 which may be configured to assist in properly locating and securing the cross bars 24 such that the cross bars 24 may be placed into the depression defined by the lip 35. The cross bars 24 may be fastened, welded, adhered or otherwise attached or bonded to the respective base units 26. In exemplary embodiments, the cross bar 24 may be received such that there is a gap between the cross bar 24 and the roof 21. The cross bars 24 may be configured to assist in dispersing or absorbing shock, stress, strain, vibrations, and other forces.

One or more pads 32 may be secured to the bottom edge of the base units 26. The pads 32 may be located and configured to provide additional support and stability to the base units 26. The pads 32 may also, or alternatively, further assist in dispersing or absorbing shock, stress, strain, vibrations, and other forces. In exemplary embodiments, the pads 32 are affixed to the bottom edge of the base units 26 such as by the threaded fastener 37, fasteners, adhesive, frictional forces, or the like. The pads 32 may be comprised of a shock and/or vibration absorbing material such as, but not limited to, rubber, silicon, plastic, or the like. The use of the pads 32 is optional.

Figure 3B:
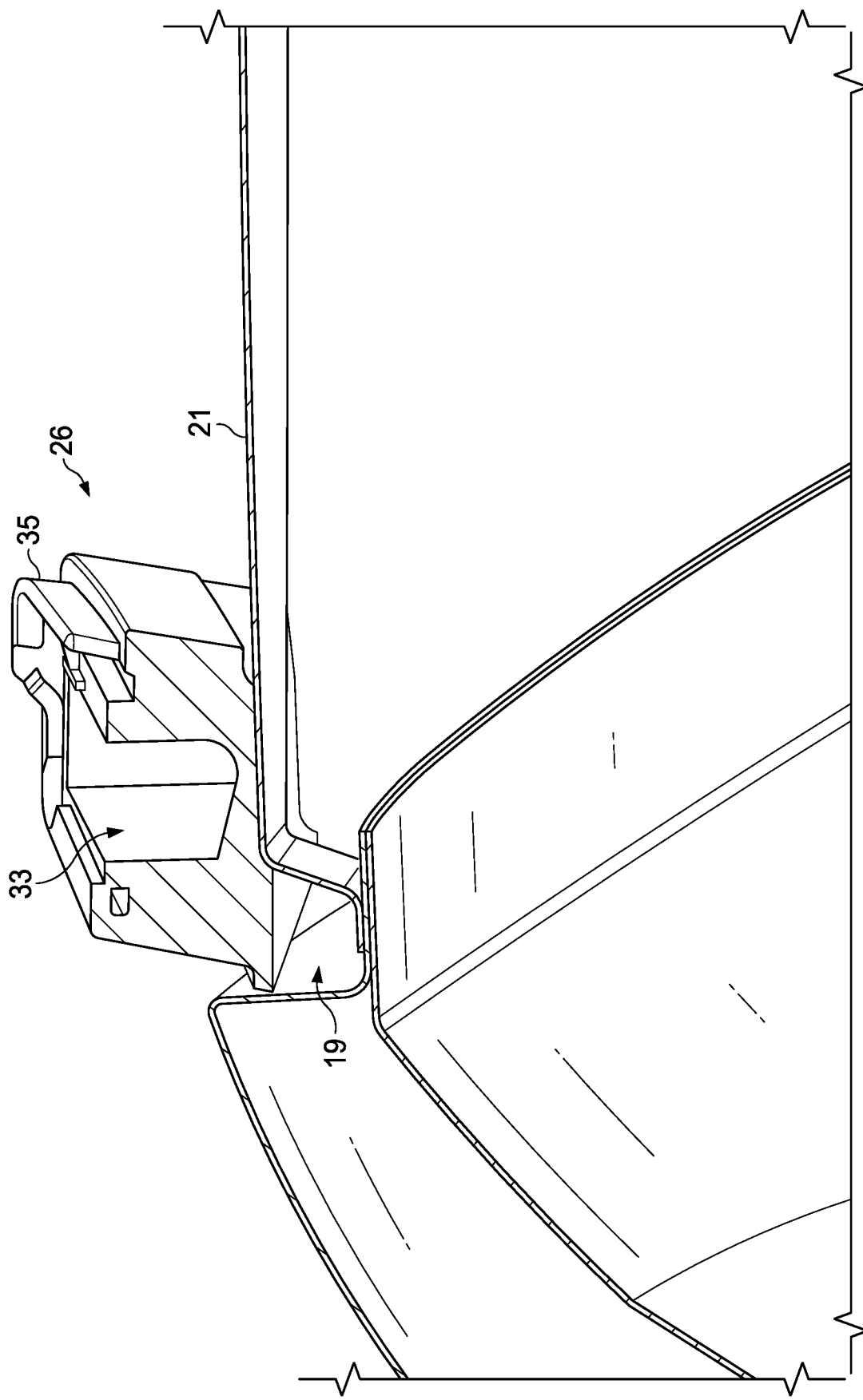
FIG. 3B is a front sectional view similar to FIG. 3A illustrated with a sectional view of an exemplary base unit.

FIG. 3A and FIG. 3B illustrate an exemplary cross section of the vehicle 20 with and without the base unit 26 installed. The base units 26 may be sized, shaped, and configured to be placed at different locations on the roof 21 based upon a number of factors including, but not limited to, the pitch and crown point of the roof 21. In exemplary embodiments, the base unit 26 may be configured to be mounted to a ditch 19 in the roof 21. The ditch 19 may be the rain ditch. In such embodiments, the base unit 26 may be formed such that a portion of the base unit 26 is configured to extend into the cavity defined by the ditch 19. In other exemplary embodiments, the base units 26 may be configured to be mounted approximately 1 inch towards the center of the vehicle 20 from the ditch 19, though any location is contemplated.

Figure 4:
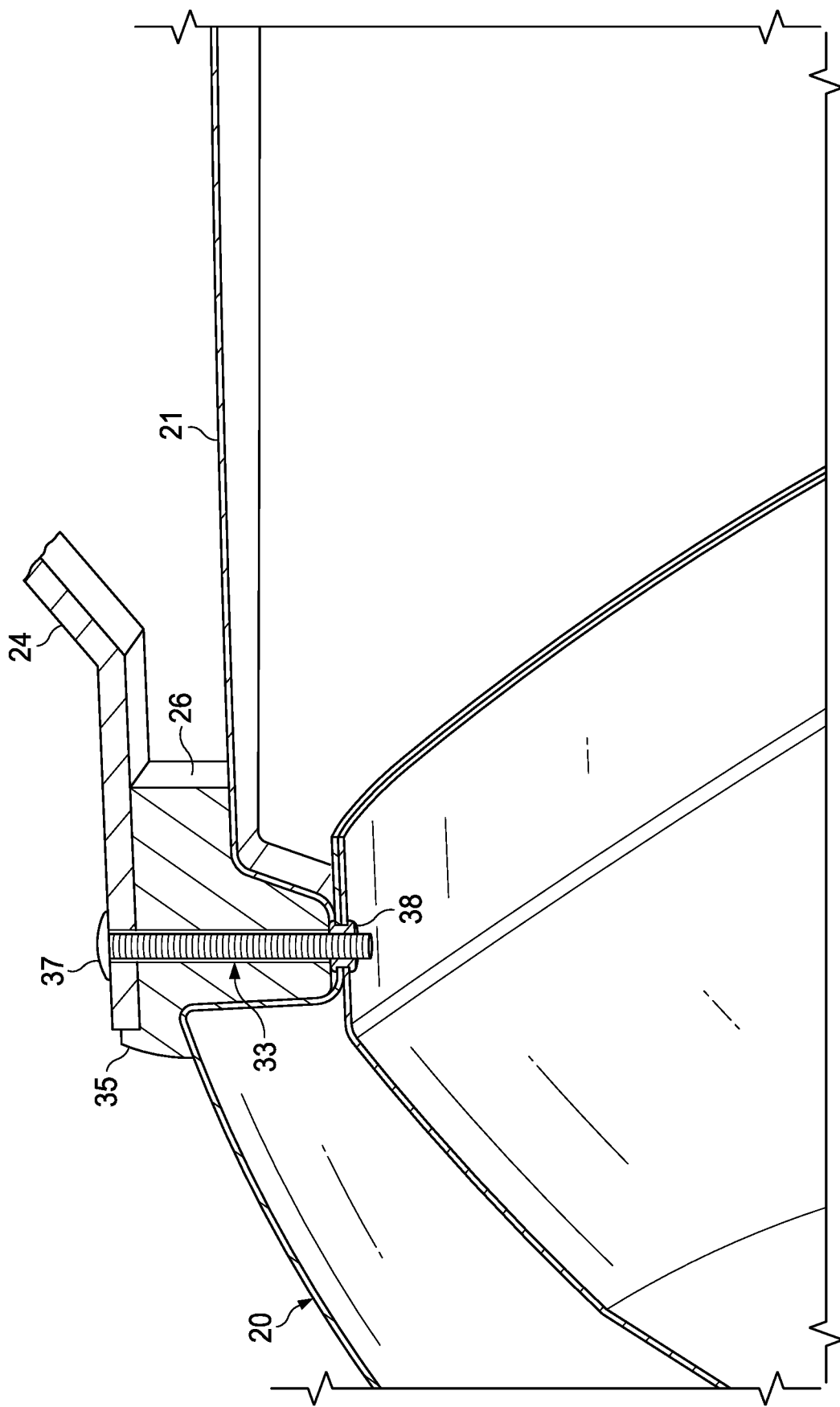
FIG. 4 is front sectional view similar to FIG. 3B illustrated with a sectional view of an exemplary base unit, cross bar, threaded fastener, and rivet nut.

FIG. 4 illustrates an exemplary mounting configuration. The cross bar 24 may be positioned along the upper portion of the base unit 26 and may be secured within the depression formed by the lip 35. The cross bar 24 may comprise a through hole configured to receive the fastener 37, which may be a threaded fastener or the like. The fastener 37 may extend through the cross bar 24, the aperture 33, and the pad 23 (if used), and into a receiver 38 configured to receive the fastener 37. In exemplary embodiments, the receiver 38 is threaded to receive the threaded fasteners 37, though such is not required. In such embodiments, the receiver 38 may be, without limitation, a rivet nut. However, other threaded receivers 38 and fasteners 37 are contemplated such as screws, bolts, nuts, and the like. The portion of the cross bar 24 configured to fit within the depression formed by the lip 35 or otherwise receive the fastener 37 may be a mounting tab that extends from the rest of the cross bar 24. Regardless, the receiver 38 may be located in the ditch 19, through any location is contemplated.

In exemplary embodiments, each base unit 26 is configured to receive two fasteners 37, each of which are threaded into the respective receivers 38. The base units 26 may be configured to receive the fasteners 37 at substantially either end of thereof, though any location is contemplated. In other exemplary embodiments, the fastener 37 may extend into the cant rails connecting the A, B, and C, pillars. In such embodiments, the fasteners 37 may extend directly into the cant rails, or the fasteners 37 may extend into the receivers 38 located in the cant rails. It is contemplated that any other type of attachment device may be utilized with the present invention, as an alternative to or in addition of those listed herein. Such other attachment devices include, but are not limited to, screws, nails, bolts, nuts, washers, adhesive, welding, or the like. Likewise, adhesives, washers, O-rings, sealant, caulking, or the like may be utilized in addition to any of the aforementioned attachment mechanisms, including but not limited to, the fasteners 37 and the receivers 38.

The fastener 37 and the receivers 38 may be configured to provide a substantially watertight seal between the mounting apparatus and the roof 21 to prevent water from intruding into the vehicle 20. The pads 32, washers, rubber seal, O-ring, caulking, sealant or the like may be utilized to ensure, or assist in creating, the substantially watertight seal. The use of the fasteners 37 and receivers 38 may permit ease of subsequent removal of the vehicle topper 10, such as but not limited to, to improve resale value of the vehicle 20 and/or to use the vehicle topper 10 on another vehicle 20.

Figure 5:
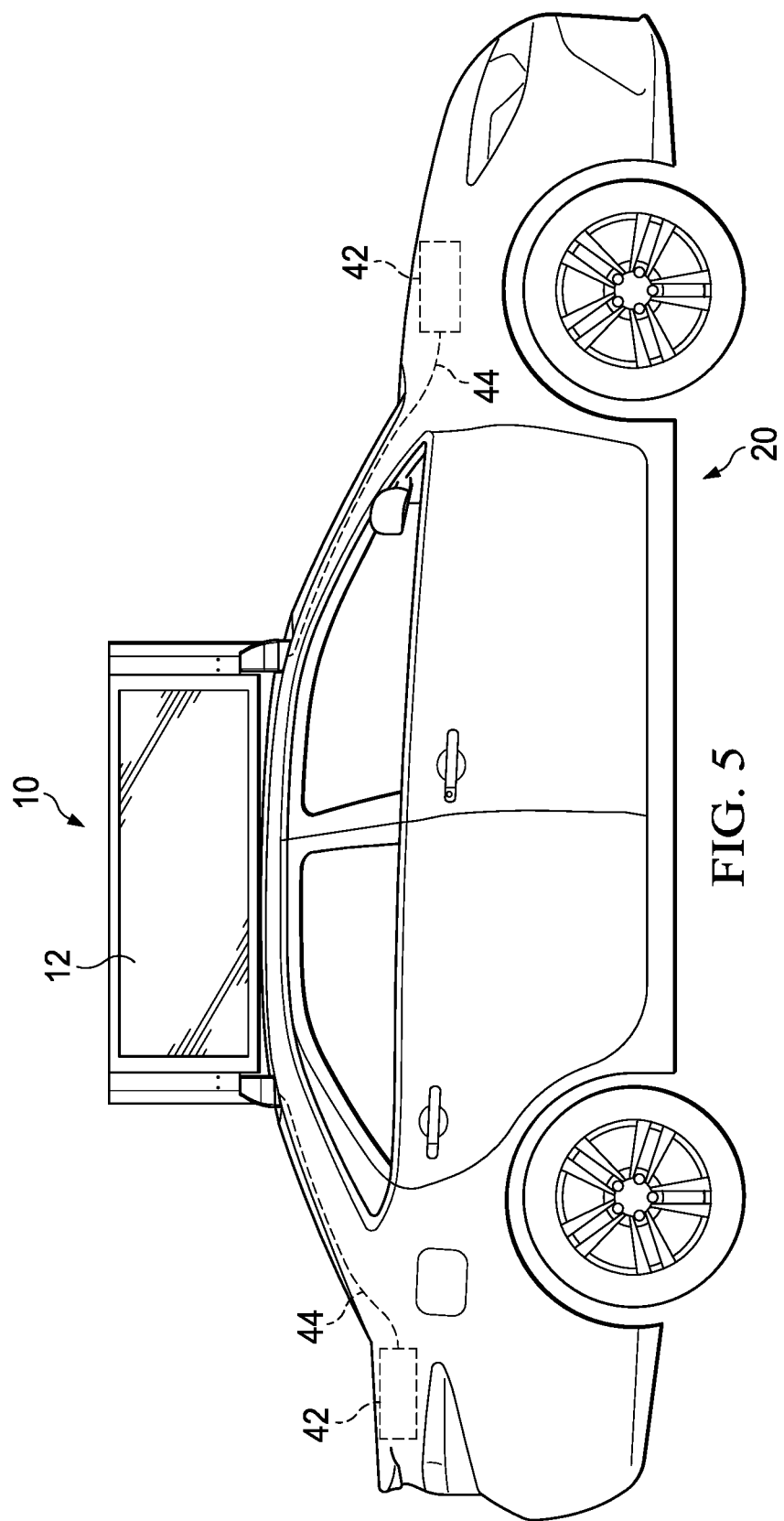
FIG. 5 is a side view of any exemplary system.
Figure 6:
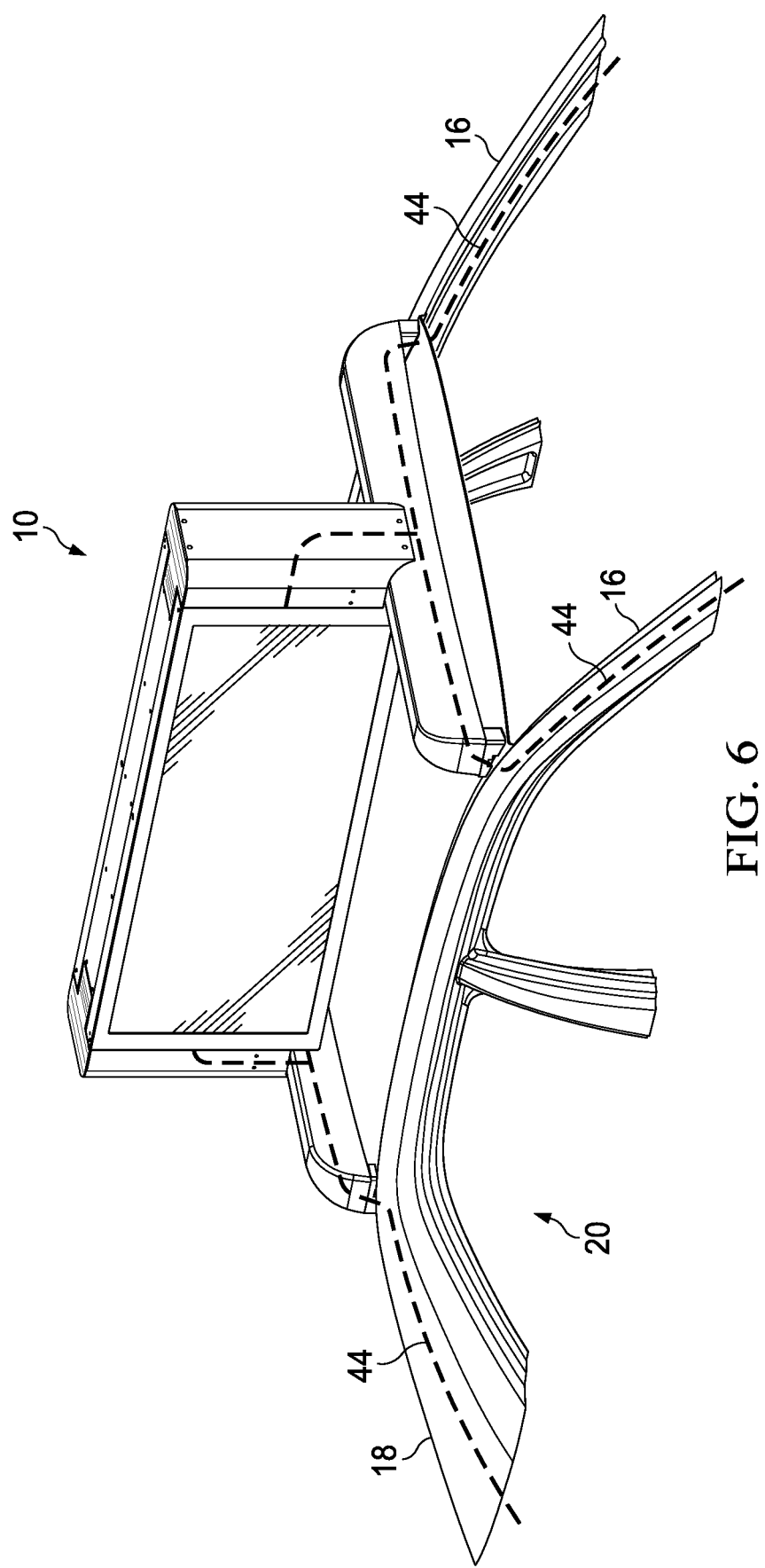
FIG. 6 is a front perspective view similar to FIG. 1A, illustrating an exemplary wiring path.

FIG. 5 and FIG. 6 illustrates an exemplary wiring arrangement and system for the vehicle topper 10 when mounted to the vehicle 20. Electrical wiring 44 may connect the vehicle topper 10 to a power source 42. In exemplary embodiments, the power source 42 may be located in the trunk or in beneath the hood of the vehicle 20, though any location is contemplated. The location of the power source 42 may be determined by the make and model of the vehicle as the power source 42 may be the vehicle's 20 battery or other power supply system. The power source 42 may be a battery pack, alternator, generator, some combination thereof, or the like. Additionally, the electrical wiring 44 may connect the vehicle topper 10 to other components used to operate the vehicle topper 10 including, but not limited to, an electronic storage device, video player, location devices, communications equipment, and the like. Such components may be located in the trunk or in beneath the hood of the vehicle 20, though any location is contemplated. The location of such equipment may depend on the make and model of the vehicle 20. Further still, the electrical wiring 44 may connect the vehicle topper 10 to the vehicle's 20 computer system. This computer system may be located in the trunk or in beneath the hood of the vehicle 20, though any location is contemplated. Indeed, the location may depend on the make and model of the vehicle 20.

Electrical wiring 44 may extend from the power source 42, the other components used to operate the vehicle topper 10, and/or the vehicle's 20 computer system along or through the A pillars 16 and/or C pillars 18 as appropriate, though any wiring path is contemplated. The electrical wiring 44 may extend along or through a single pillar or through multiple pillars. For example, but not to serve as a limitation, the electrical wiring 44 may be separated and passed through multiple pillars so as to minimize the size of each individual wire bundle. In exemplary embodiments, the electrical wiring 44 extends along the black mask area and/or behind the trim surrounding the A pillars 16 or C pillars 18 so it is not visible from the interior or exterior of the vehicle 20. The electrical wiring 44 may be secured to the vehicle 20 using VHB tape, though any means of attachment is contemplated. Additionally, the wiring 44 may be secured to the vehicle 20 or various components described herein using VHB tape, other types of tape or adhesives, rope, zip-ties, rubber bands, some combination thereof, and the like. The electrical wiring 44 may then extend along or through the base units 26. In exemplary embodiments, the electrical wiring 44 may extend through the exterior side channel 34, the aperture 33, and the interior side channel 36. The electrical wiring 44 may then extend along or through the cross bars 24. In exemplary embodiments, the electrical wiring 44 may extend between the cross bar fascia 23 and the cross bar 24. The electrical wiring 44 may then extend through the end cap fascia 28 and to or into the vehicle topper 10. Any wiring path is contemplated.

In exemplary embodiments, the electrical wiring 44 is comprised of festoon type wire, though any type of electrical wiring is contemplated. The electrical wiring 44 may be utilized not only to deliver power to the vehicle topper 10 but also to facilitate the communication of data to and from the vehicle topper 10 and other components of the system including, but not limited to, data regarding content to be displayed on the displays 12, the location of the vehicle topper 10, the content currently or previously displayed on the displays 12, temperature information, fan speed, ambient light readings, ambient conditions information, status data, operations data, and the like. Further, the electrical wiring 44 may be in electrical communication with the vehicle's 20 computer and may communicate vehicle status data and other data to and from the vehicle topper 10 or other components of the system, including but not limited to, engine on and off signals. For example, but not to serve as a limitation, when the vehicle topper 10 receives a signal that the vehicle's 20 engine is off, the vehicle topper 10 may power off. Likewise, when the vehicle topper 10 receives a signal that the vehicle's 20 engine is on, the vehicle topper 10 may power on.

Figure 7:
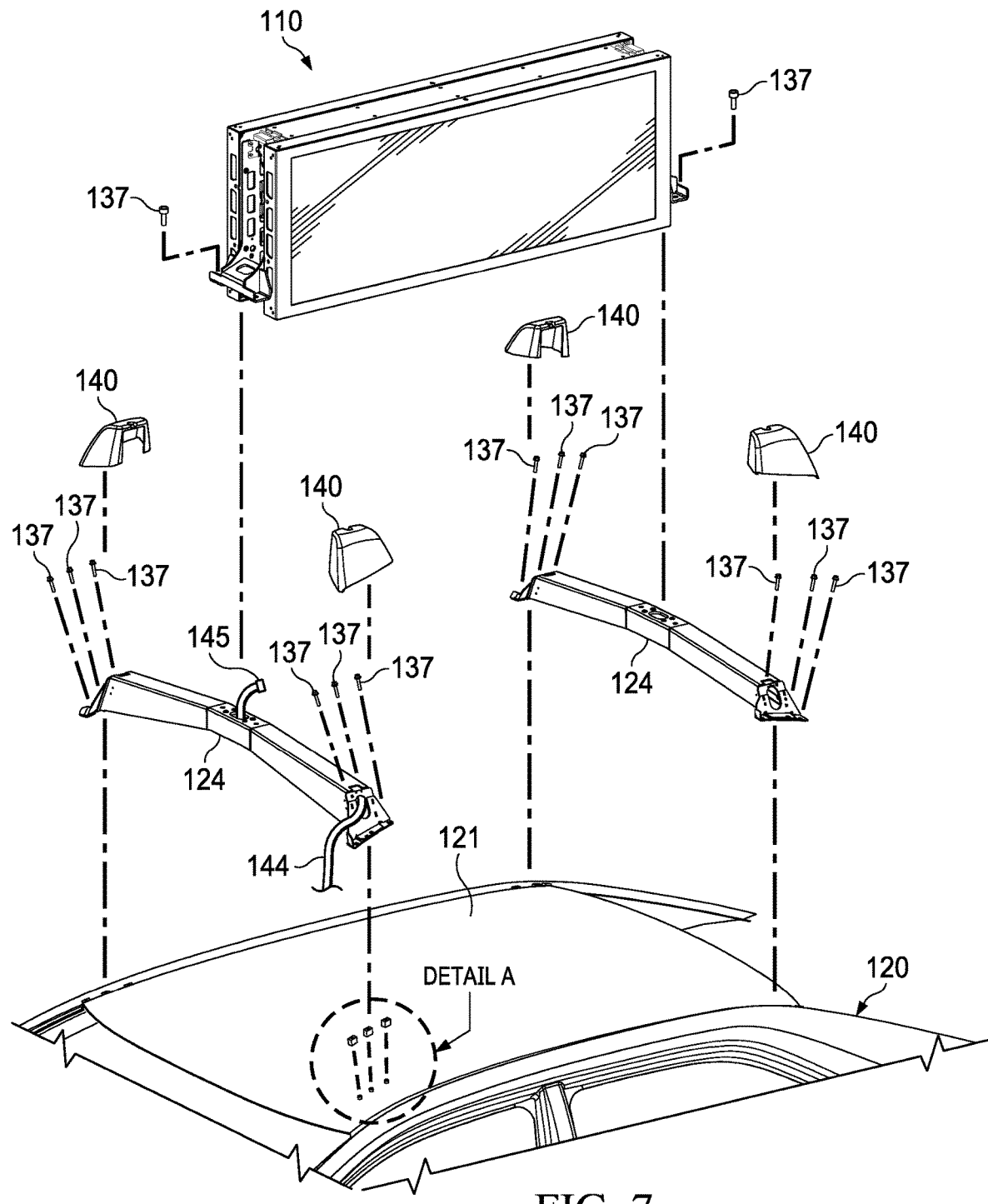
FIG. 7 is an exploded view of another exemplary vehicle topper and roof mounting apparatus, also indicating Detail A.

FIG. 7 is an exploded view of another exemplary vehicle topper 100 and roof mounting apparatus and system in accordance with the present invention, also indicating Detail A. Features similar to those illustrated and described with respect to FIGS. 1-6 have been similarly numbered but increased by 100 (e.g., 37 to 137). A vehicle topper unit 110 may be secured to a first and second cross bar 124 located on the front and rear portions of the roof 121 of a vehicle 120. As will be described in greater detail herein, the cross bars 124 may be secured to a ditch 119 in the roof 212 by the use of fasteners 137. The ditch 119 may be, but is not limited to, the rain ditch. The cross bars 124 may be configured to receive wiring 144, which may extend through the cross bars 124 and may be connected to the vehicle topper unit 110. In exemplary embodiments, a connector 145 may be located on the end of the wiring 144 and may be configured to provide a connection/disconnection point for placing the vehicle topper 110 in electrical connection with the wiring 144. In exemplary embodiments, the cross bars 124 are comprised of one or more metals, which may be powder coated or otherwise treated, though any material having any kind of treatment is contemplated. As described in greater detail herein, particularly with respect to FIG. 16A and FIG. 16B, a cap 140 may be placed on any or all of the outer ends of the cross bars 124, though such is not required.

The vehicle topper 110 may be secured to approximately the mid-section of the cross bars 124 at either end thereof. However, it is contemplated that the vehicle topper unit 110 may be secured to any location on the cross bars 124. In exemplary embodiments, the vehicle topper 110 is secured to the cross bars 124 by use of the fasteners 137. It is contemplated that each of the fasteners 137 illustrated and described herein may be the same or different as other fasteners 137 illustrated and described herein.

It is contemplated that any other type of fastener 137, receiver 138, or other type of attachment device may be utilized with the present invention, including but not limited to, screws, nails, bolts, nuts, washers, adhesive, welding, or the like. Likewise, adhesives, washers, O-rings, sealant, caulking, or the like may be utilized in addition to any of the aforementioned attachment mechanisms, including but not limited to, the fasteners 137 and receivers 138.

Figure 8:
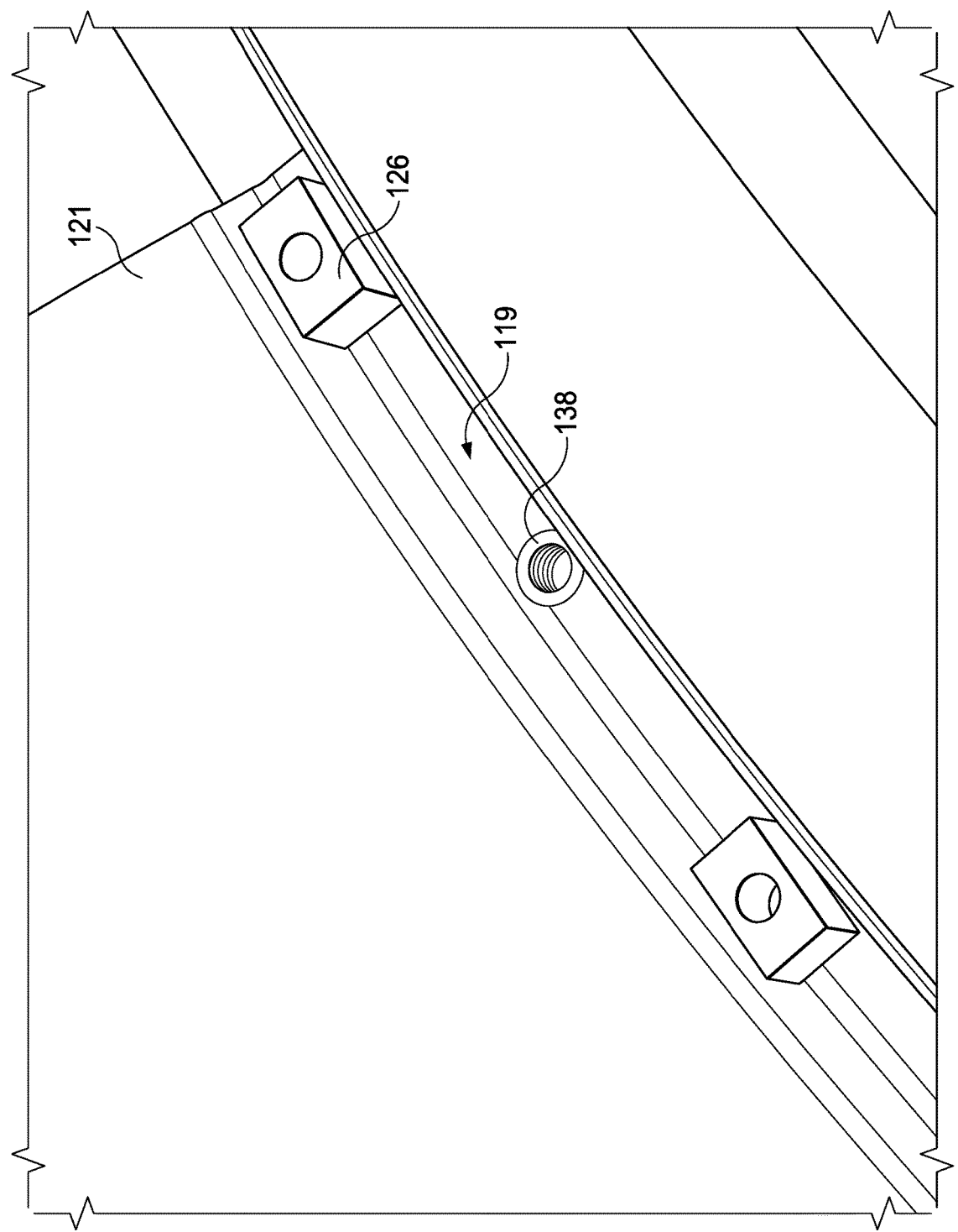
FIG. 8 is a detailed top perspective view of some of the components of Detail A of FIG. 7 partially assembled.

FIG. 8 is a detailed top perspective view of some of the components indicated in Detail A of FIG. 7 partially assembled. More particularly, FIG. 8 illustrates exemplary placement of the receivers 138 in the ditch 119. In exemplary embodiments, the receivers 138 are threaded, such as but not limited to, rivet nuts. Regardless, the receivers 138 may be configured to receive and secure the fasteners 137. A block 126 may be used to vertically space the cross bar 124 from the receiver 138. The block 126 may be configured to allow the fastener 137 to pass therethrough and into the receiver 138. In exemplary embodiments, the block 126 is approximately the same height as the ditch 119 such that the top surface of the block 126 is substantially flush with the roof 121 when located in the ditch 119. However, any size and height block 126 is contemplated. In exemplary embodiments, the block 126 is comprised of metal, though any type of material is contemplated.

Figure 9:
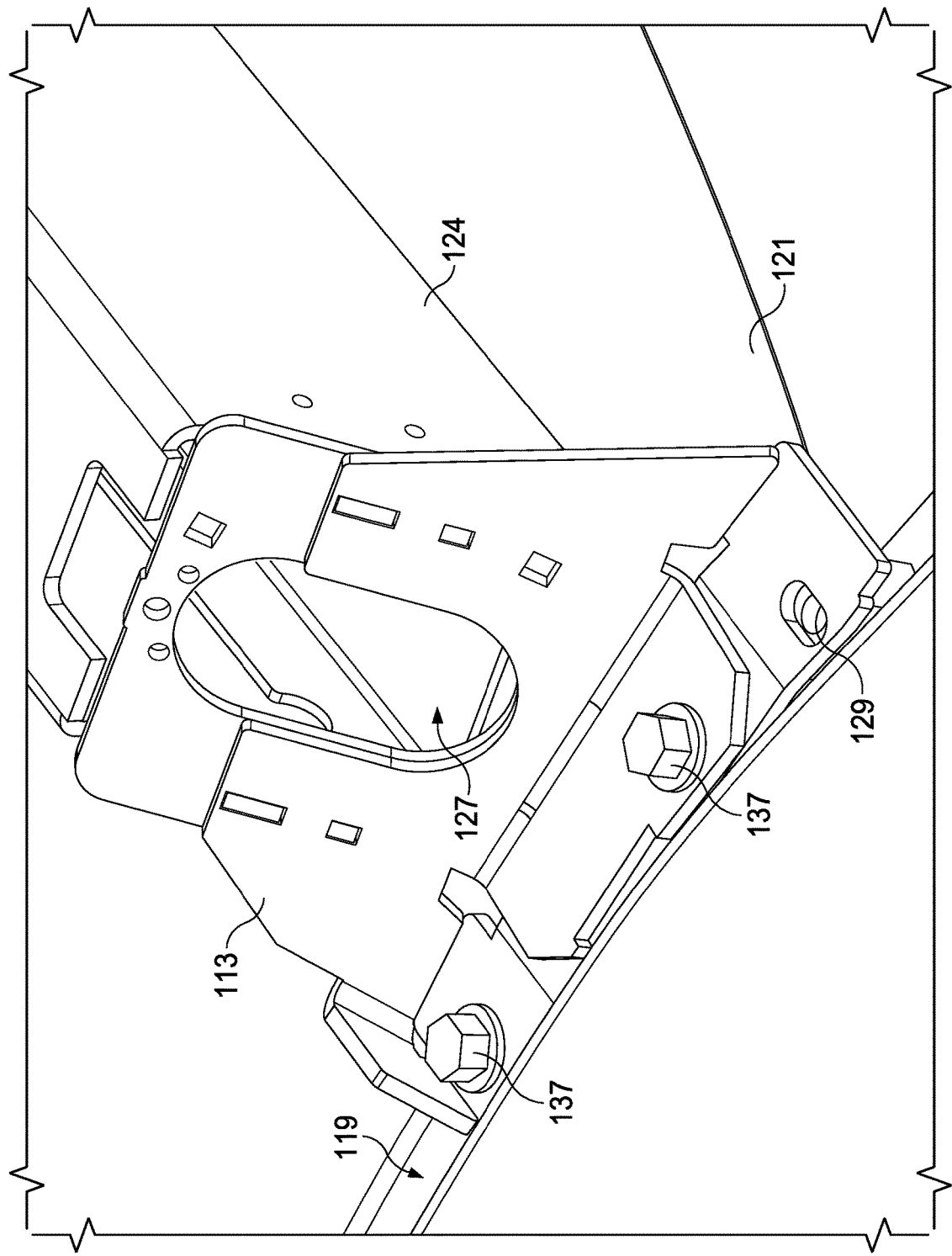
FIG. 9 is a detailed side perspective view of the system of FIG. 7 partially assembled.
Figure 12:
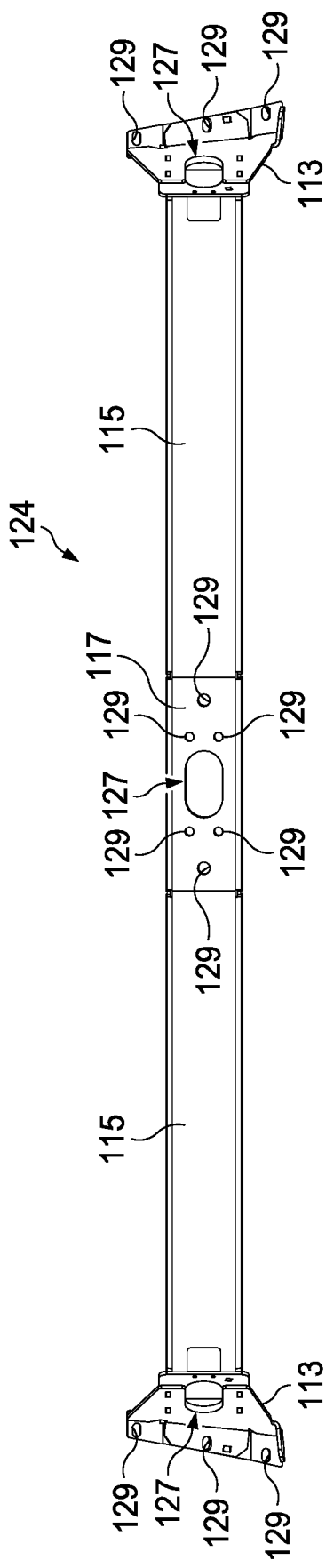
FIG. 12 is a top view of the cross bar of FIG. 10.
Figure 13:
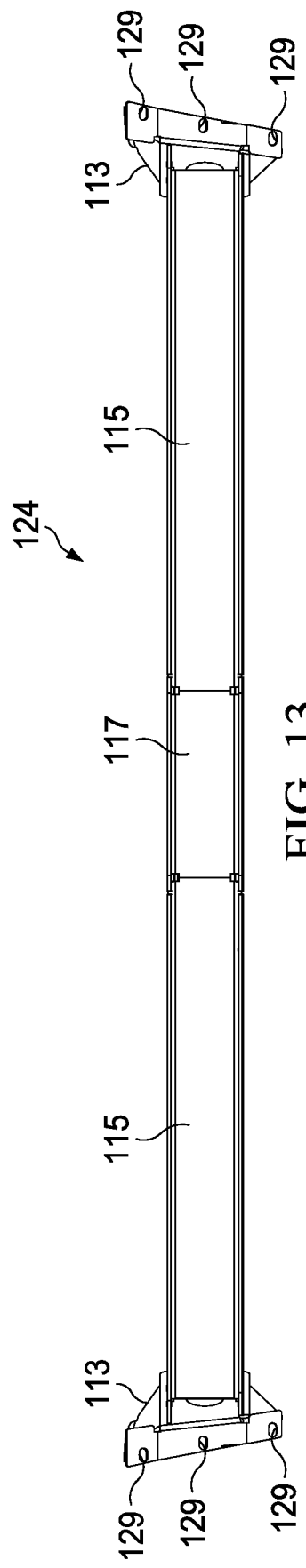
FIG. 13 is a bottom view of the cross bar of FIG. 10.

FIG. 9 is a detailed side perspective view of Detail A of FIG. 7 partially assembled. More specifically, FIG. 9 illustrates the cross bar 124 installed over the ditch 119. The fasteners 137 may be secured through apertures 128 located in the outer plate 113 of the cross bar 124. The fasteners 137 may extend through the apertures 129, through the block 126, and into the receivers 138, thereby securing the cross bar 124 to the roof 121 of the vehicle 120. The receivers 138 may be located in the ditch 119 such that the cross bar 124 is secured to the ditch 119.

FIG. 10 through FIG. 13 illustrate various views of the cross bar 124 in isolation from the other components. The cross bar 124 may comprise a center section 117 with a first and second tapered section 115 extending from either side thereof. An outer plate 113 may be bonded or otherwise attached to the outer ends of the tapered sections 115. In exemplary embodiments, the cross bar 124 may be hollow.

The center section 117 may be of substantially uniform cross section. In exemplary embodiments, the center section 117 may comprise a substantially rectangular cross section, though any shape is contemplated. Regardless, the center section 117 may provide a substantially level surface for mounting the vehicle topper 110 thereto. A number of apertures 129 may be located in the upper surface of the center section 117 and may be configured to receive fasteners 137 for securing the vehicle topper 110 to the cross bar 124. The apertures 129 themselves may be threaded or a nut and bolt or other fastener may be used to secure the fasteners to the cross bar 124. Alternatively, the vehicle topper 110 may be bonded, adhered, or otherwise affixed to the cross bar 124.

In exemplary embodiments, the cross bars 124 may be hollow such that the wiring 144 may be extended through at least a portion thereof, though such is not required. A wiring aperture 127 may be located in substantially the center of the upper surface of the center section 117, though any location is contemplated. The wiring aperture 127 may be configured to permit the wiring 144 to pass therethrough. In this way, the vehicle topper 110 may be placed in electrical connection with the wiring 144, which may extend through the cross bar 124. In exemplary embodiments, rubber grommets may be placed around the wiring apertures 127 to assist in prevent the wiring 144 from becoming damaged when contacting the wiring apertures 127.

A first and second tapered section 115 may be bonded or otherwise secured to either side of the center section 117. In exemplary embodiments, the tapered sections 115 may comprise a substantially trapezoidal cross section, though any shape cross section is contemplated. In further exemplary embodiments, the cross section of the tapered sections 115 increases from where the respective tapered section 115 is connected to the center section 117 to the opposing end thereof, though the reverse is contemplated. Additionally, it is contemplated that the tapered sections 115 may vary in cross section randomly or in any pattern. Regardless, the varying cross section of the tapered sections 115 may be configured to provide varying natural or resonant frequencies and/or varying characteristics so as to dampen or otherwise attenuate the vibrational forces generated by or transmitted through the cross bar 124 that would otherwise likely be experienced in a cross bar having a uniform cross section. It is further contemplated that the center section 117 may have a varying cross section. The varying cross section may also provide an aesthetically pleasing appearance.

A first and second outer plate 113 may be located on the outer ends of each of the tapered sections 115, respectively. The outer plate 113 may serve to at least partially enclose the end of the respective tapered section 115. In exemplary embodiments, the lower portion of the outer plate 113 may extend at an angle therefrom such that the lower portion may be place substantially flush with the surface of the roof 121. For example, without limitation, the outer plate 113 may form a substantially "L" shape. The lower portion of the outer plate 113 may comprise a number of apertures 129 therein, which may be configured to receive the fasteners 137 for mounting the cross bar 124 to the receivers 138 located in the roof 121. The outer plates 113 may be configured to elevate the lower surface of the tapered sections 115 above the roof.

The outer plates 113 may further comprise a wiring aperture 127, which may be sized to permit the wring 144 to pass therethrough. In this way, the wiring 114 may travel into and through the tapered section 115 via the wiring aperture 127 located in the outer plate 113, through at least a portion of the center section 117, and may exit the cross bar 124 via the wiring aperture 127 located in the center section 117. The wiring apertures 127 located in the outer plates 113 and the center section 117 may be the same or different size and shape. In exemplary embodiments, the wiring 114 may pass through a single tapered section 115, however it is contemplated that the wiring 114 may pass through more than one tapered section 115. For example, without limitation, multiple wiring 114 strands or cords may be utilized.

In exemplary embodiments, the outer plates 113 and the tapered sections 115 may comprise apertures, receivers, or brackets for attaching the caps 140 thereto. The caps 140 may be configured to extend over a portion of the cross bar 124 and provide an aesthetically pleasing appearance, improve aerodynamics, and disguise the wiring. Fasteners or adhesives may be used, in the alternative or addition, to secure the caps 140 to the cross bars 124. Further, the caps 140 may be bonded to the cross bars 124.

Figure 14A:
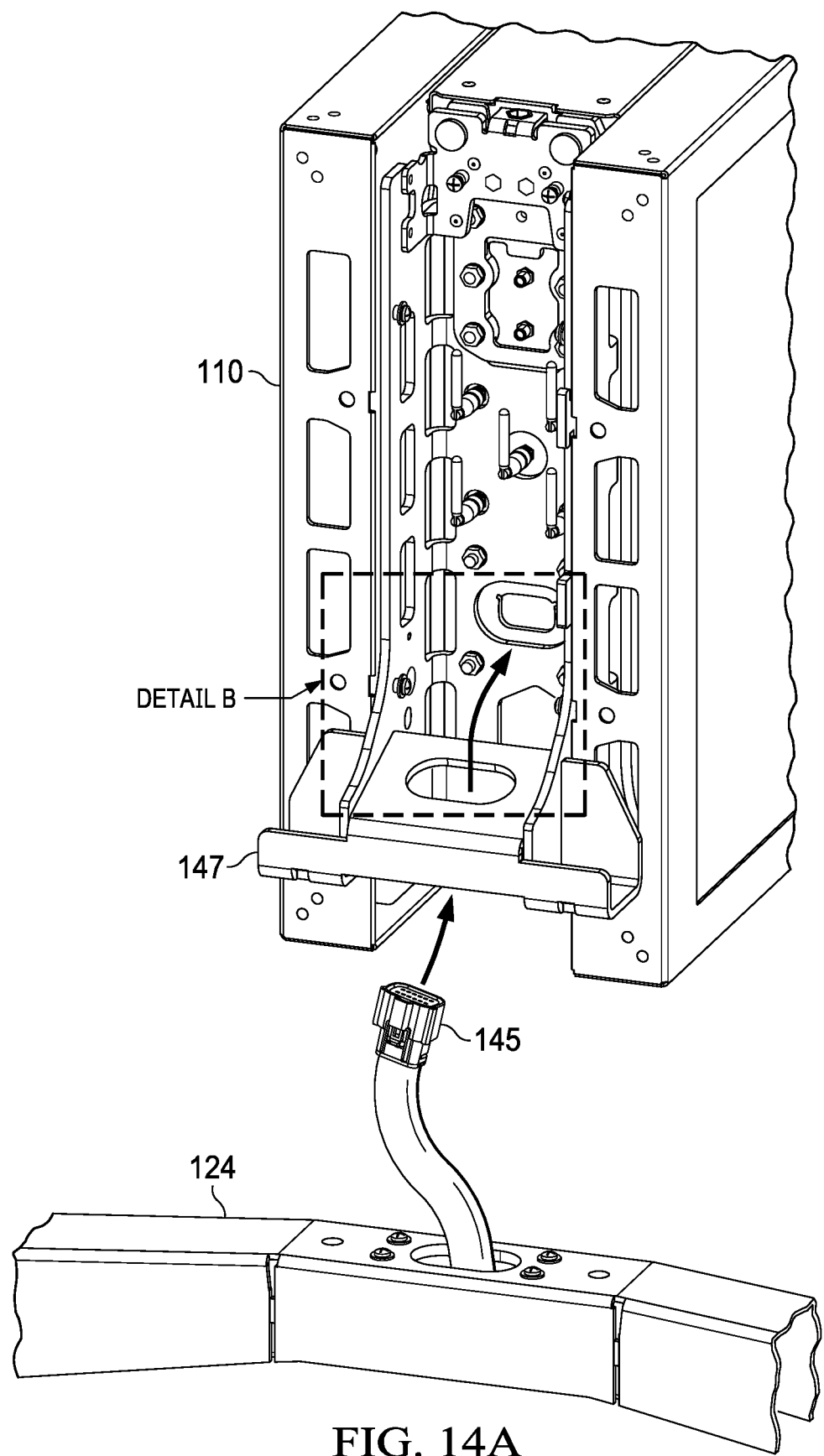
FIG. 14A is a front perspective view of a partially assembled and partially installed exemplary vehicle topper, also indicating Detail B.
Figure 14B:
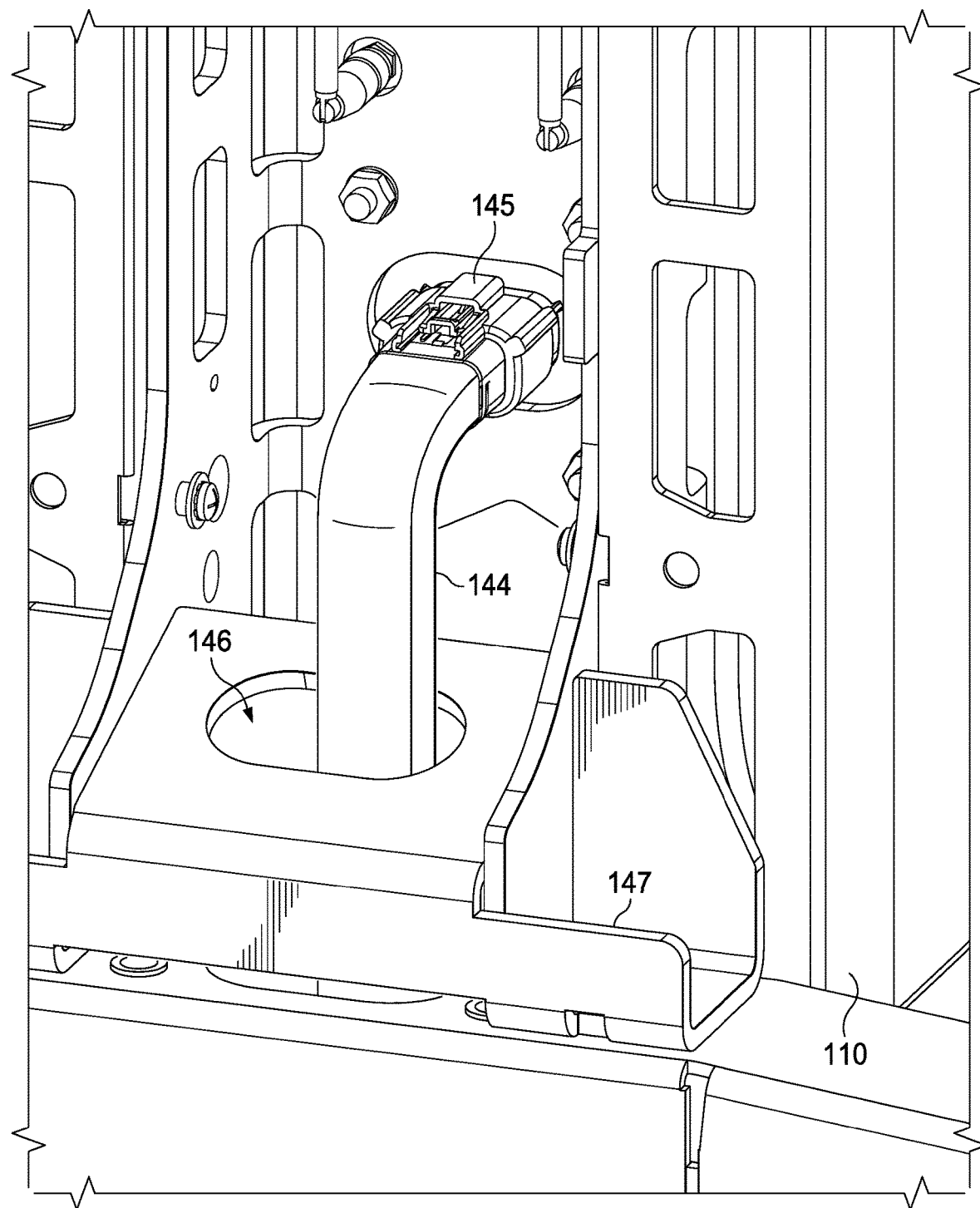
FIG. 14B is a front perspective view of Detail B of FIG. 14A with the components partially assembled.

FIG. 14A and FIG. 14B illustrate the vehicle topper 110 at least partially mounted to the cross bar 124. The wiring 144 and connector 145 may be passed through the cross bar 124 and may travel through an aperture 146 located in a mounting bracket 147 on the vehicle topper 110. The connector 145 may be placed in contact with a corresponding receptacle located on the vehicle topper 110. In exemplary embodiments, the connector 145 is a plug or an outlet, though any type of connector is contemplated. In this way, the vehicle topper 110 may be placed in electrical connection with the vehicle 200 as described and illustrated herein, particularly with respect to FIGS. 5 and 6.

Figure 15A:
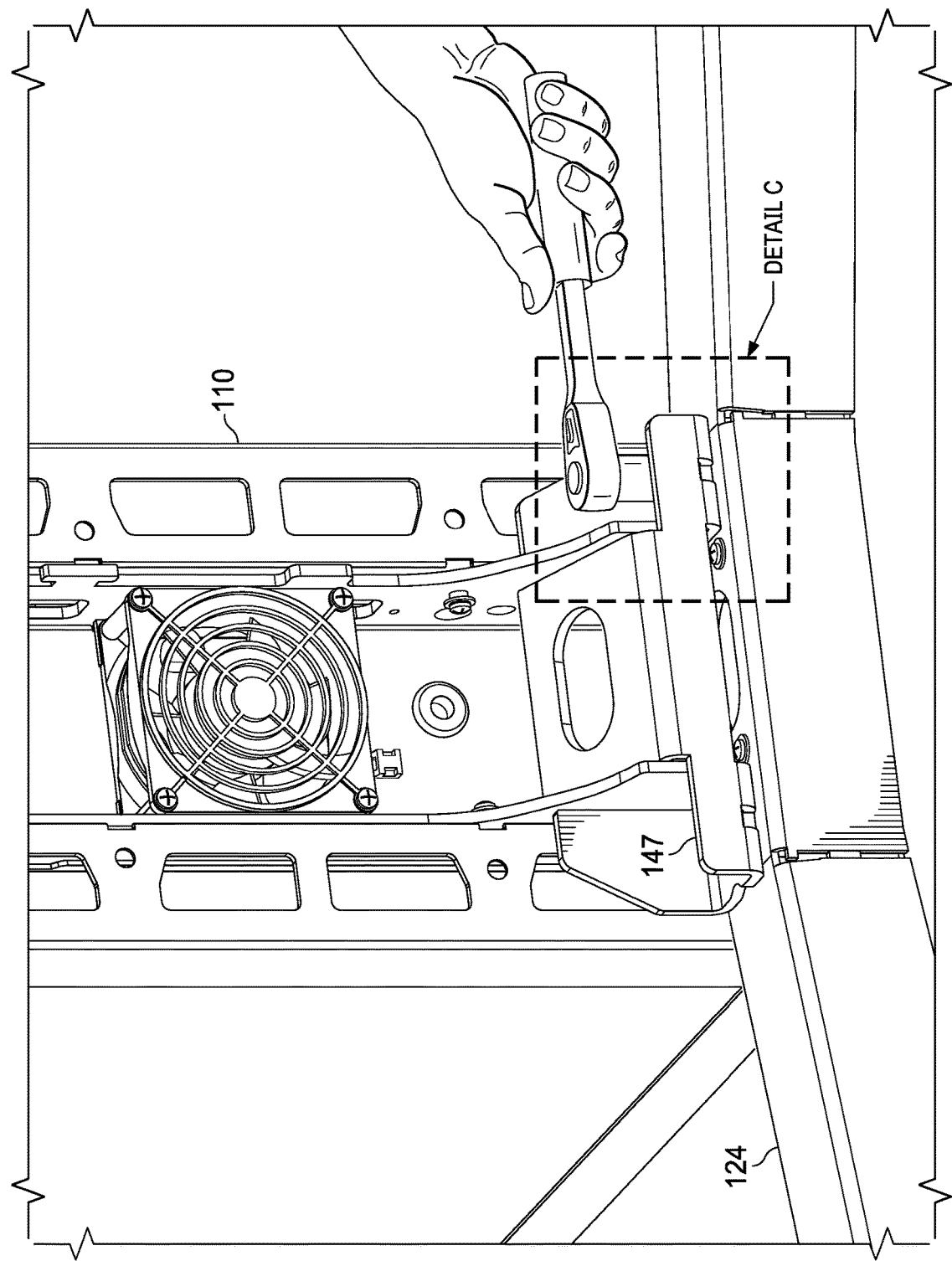
FIG. 15A is a front perspective view of an exemplary vehicle topper undergoing installation on an exemplary cross bar, also indicating Detail C.
Figure 15B:
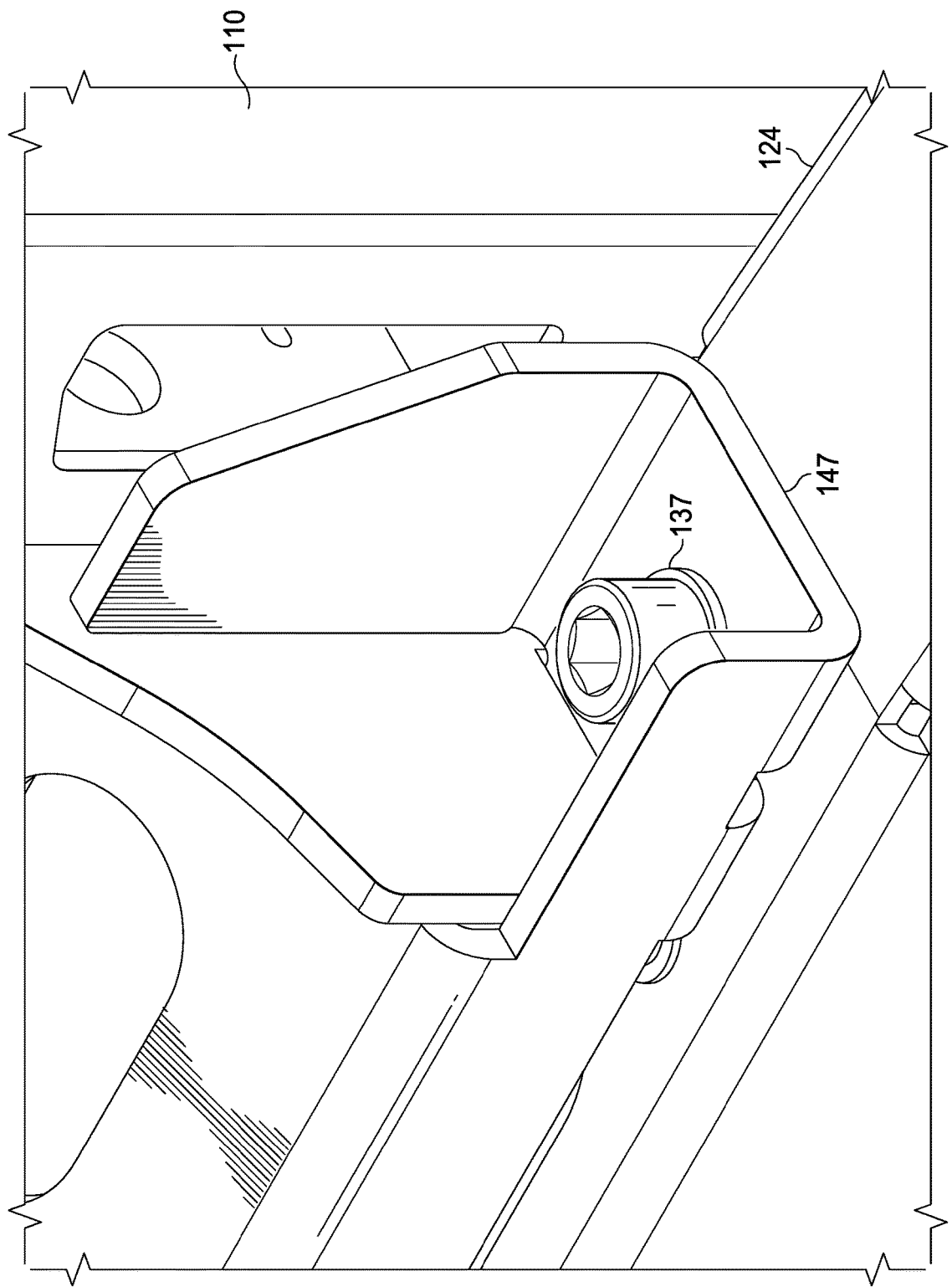
FIG. 15B is a detailed top perspective view of Detail C of FIG. 14A.

FIG. 15A and FIG. 15B illustrate an exemplary partial mounting of the vehicle topper 110 to the cross bar 124. The fastener(s) 137 may be passed through the mounting bracket 147 and may be passed through the aperture(s) 129 on the cross bar 124. In exemplary embodiments, the apertures 129 may be threaded such that they secure the fasteners 137. In other exemplary embodiments, receivers 138 are installed in or below the apertures 129 to receive and secure the fastener 137. In still other exemplary embodiments, the fasteners 137 may be secured by a nut, frictional forces, welding, bonding, adhesives, or the like. Any means of securing the fastener 137 is contemplated.

Figure 16A:
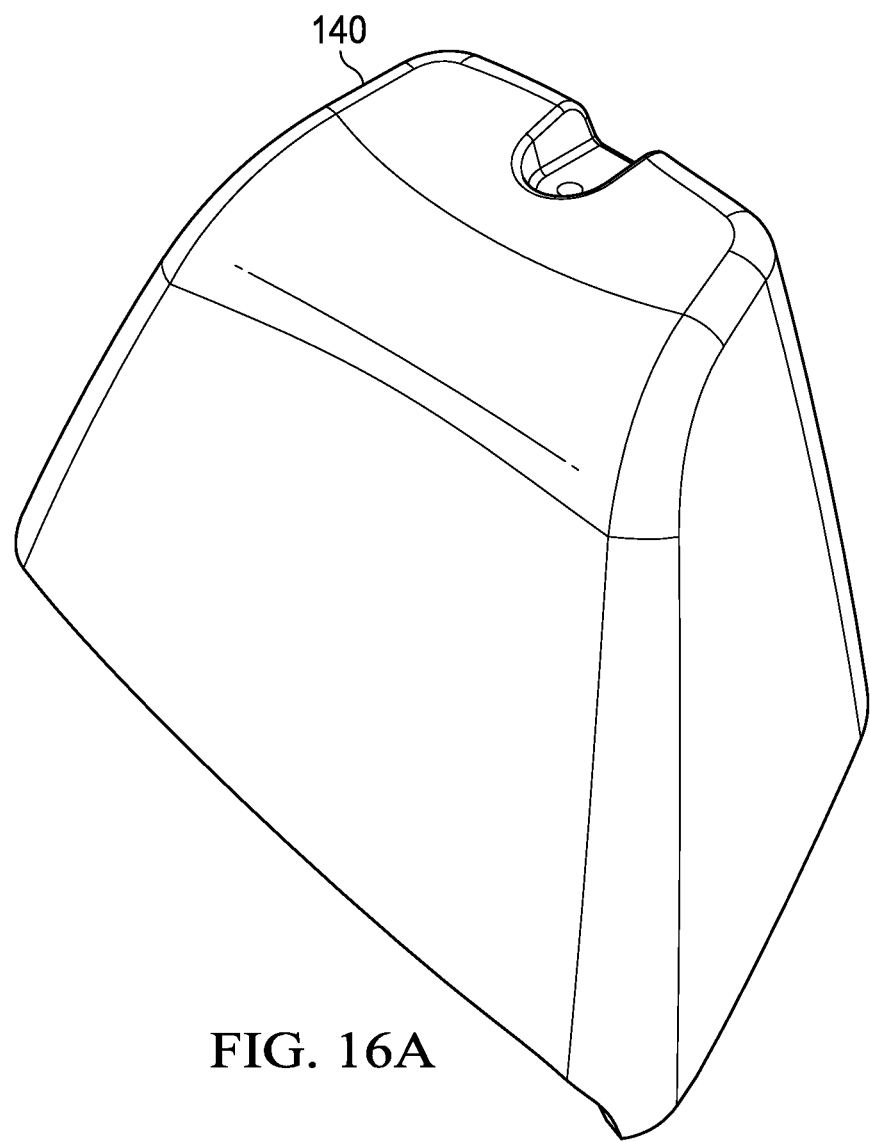
FIG. 16A is a front perspective view of an exemplary cap for use with the cross bar.
Figure 16B:
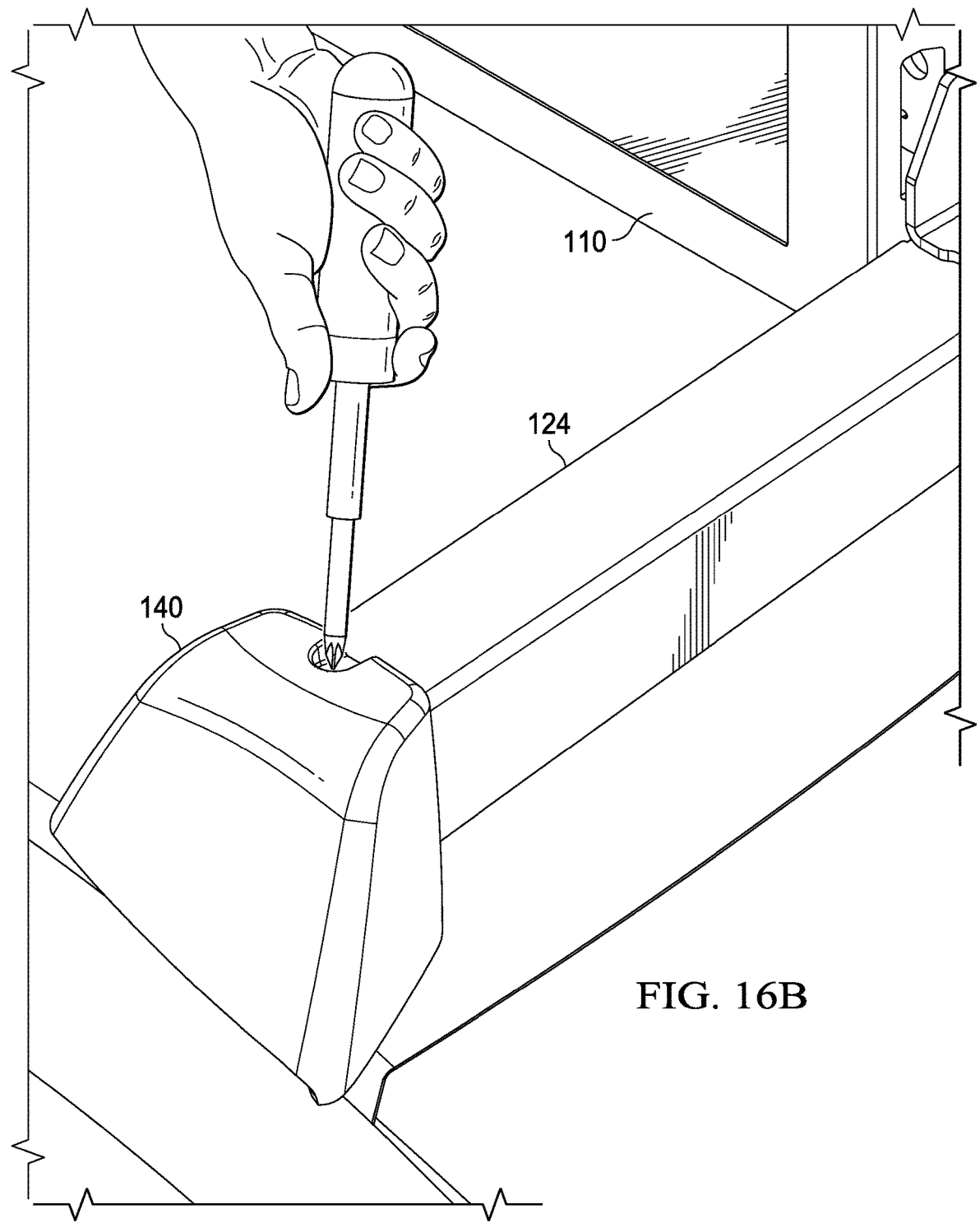
FIG. 16B is a side perspective view of the cap of FIG. 16A undergoing installation on an exemplary cross bar.

FIG. 16A is a front perspective view of an exemplary cap 140, and FIG. 16B illustrates an exemplary installation of the cap 140 on the cross bar 124. The cap 140 may be configured to cover an end of the cross bar 124 when installed. In exemplary embodiments, the caps 140 may provide an aesthetically pleasing appearance, may improve aerodynamics, and may cover and protect at least a portion of the wiring 144, fasteners 137, and related components. The caps 140 may be connected to the cross bars 124 by fasteners, adhesive, or the like. Alternatively, or in addition, the caps 140 may be bonded to the cross bars 124. In exemplary embodiments, the cross bars 124 may comprise brackets configured to receive and secure the caps 140. In exemplary embodiments, the caps 140 are comprised of a polymer, though any material is contemplated.

Figure 17A:
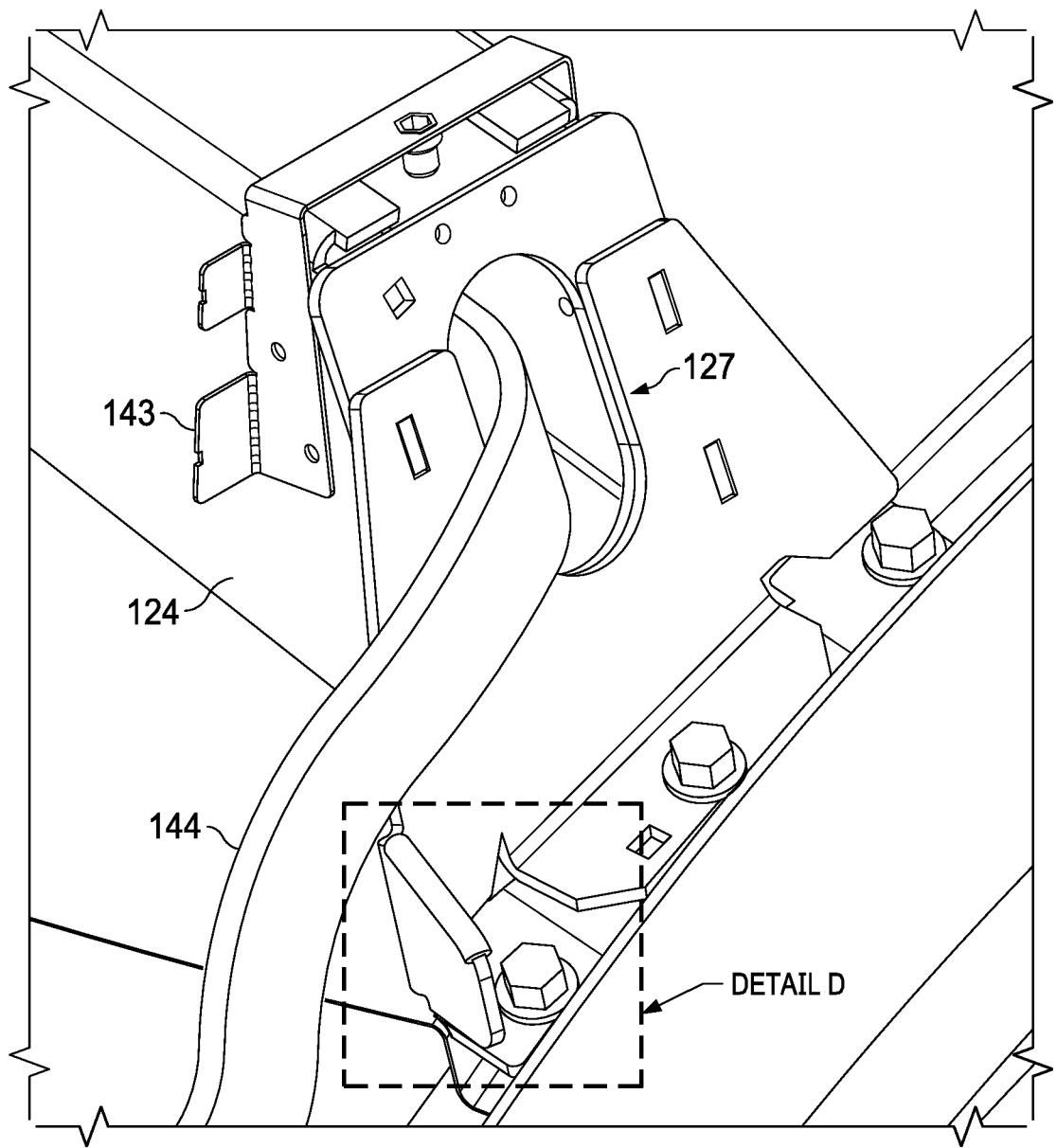
FIG. 17A is a side perspective view of exemplary wiring partially installed on an exemplary cross bar, also indicating Detail D.

FIG. 17A illustrates the wiring 144 extending through the wiring aperture 127 in the cross bar 124. An exemplary bracket 143 for receiving and securing the cap 140 is also illustrated. The bracket 143 may be installed on the tapered section 115 or the outer plate 113 of the cross bar 124 and may be configure to receive and secure the cap 140. The cap 140 may be configured to likewise fit over the bracket 143 and the cross bar 124. The bracket 143 may be configured to secure the cap 140 to the cross bar 124.

Figure 17B:
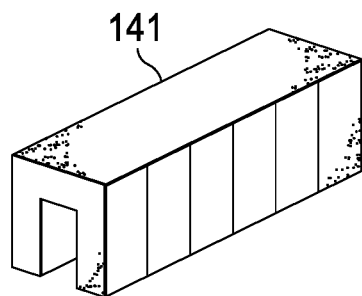
FIG. 17B is a detailed front perspective view of detail D of FIG. 17A with an exemplary edge guard shown in isolation from other components.

FIG. 17B illustrates an exemplary edge guard 141 for use with the cross bar 124. The edge guard 141 may be placed on various parts of the cross bar 124 to protect the wiring 144 from damage when contacting the cross bar 124. In exemplary embodiments, the edge guard is comprised of a rubber and is configured to substantially cover sharp edges such as to prevent damage to the wiring 144 which may come into contact with such edges. It is contemplated that other, similar edge guards 141 may be used with other components described herein.

Figure 18B:
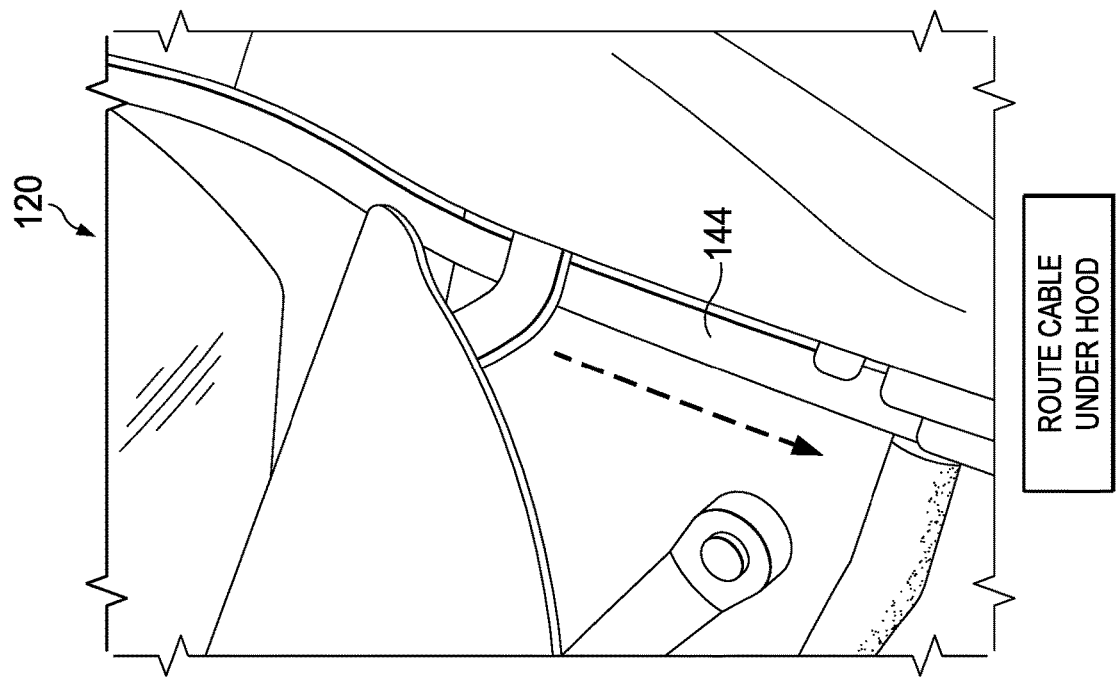
FIG. 18B is a front perspective view similar to FIG. 18A.
Figure 18A:
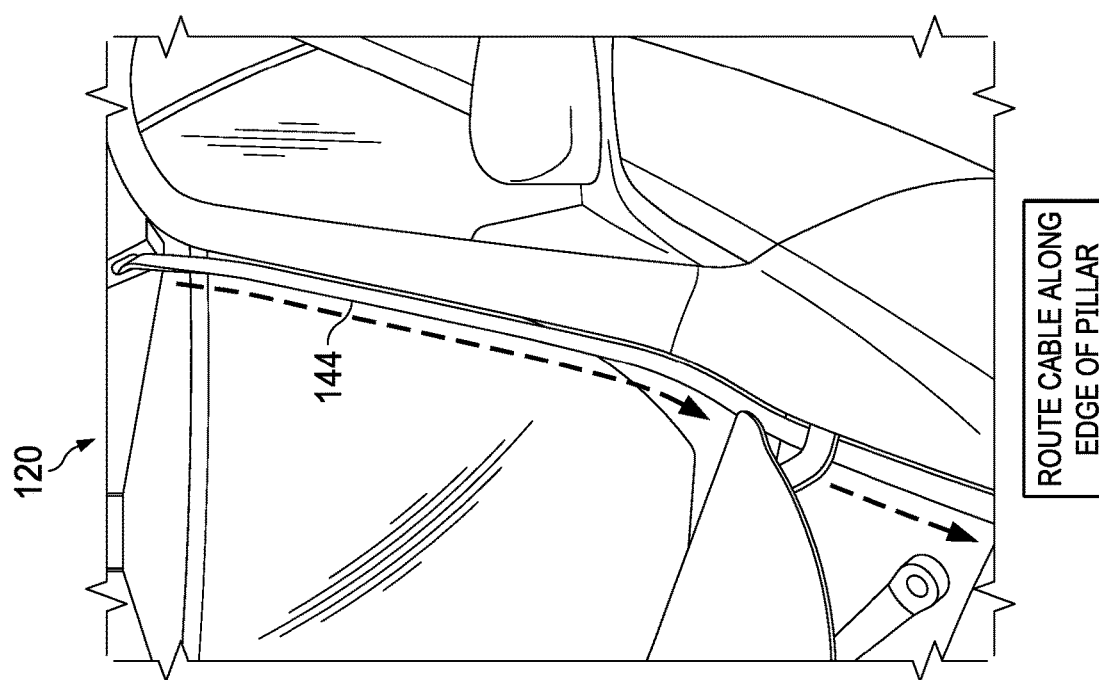
FIG. 18A is a front perspective view of an exemplary vehicle indicating installation locations and instructions for wiring.
Figure 18C:
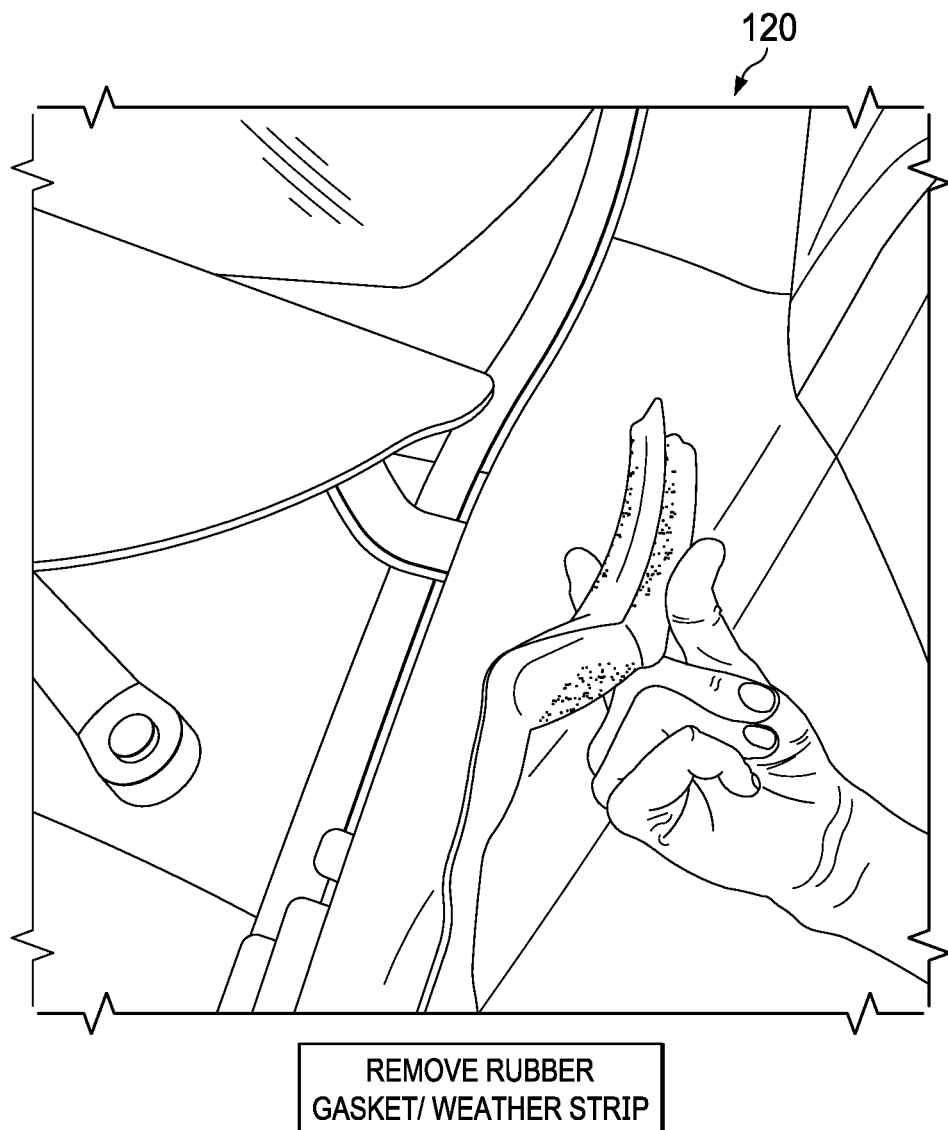
FIG. 18C is a front perspective view similar to FIG. 18A.

FIG. 18A, FIG. 18B, and FIG. 18C illustrate exemplary wiring 144 paths and installation steps. The wiring 144 may be routed along the edge of the vehicle's 120 A pillar. The wiring 144 may then be routed under the hood of the vehicle 120 by removing the rubber gasket/weather strip, if present. The wiring 144 may subsequently be connected to various switches and fuses located on or in the vehicle 120.

The wiring pathways and methods of installation described herein are merely exemplary and are not intended to be limiting. Any wiring pathway or method of installation is contemplated. It is further contemplated that any and all of the components described herein may be customized, particularly with respect to size and shape, in order to be fitted to various vehicles 210. The wiring 144 may be configured to carry electrical power as well as data and other communications.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A cross bar for mounting a vehicle topper to a roof of a vehicle, said cross bar comprising:
    a center section having a consistent cross section, a first end, and a second end;
    a first and second section, each extending from one of the first end and the second end of the center section, and each having a varying cross section along a length thereof; and
    a first and second end component, each located at one of the first and second sections;
    wherein each of the center section, the first section, and the second section extend primarily in a horizontal direction across the roof of the vehicle;

wherein each of said first and second end components extend primarily in a vertical direction to elevate the center section, the first section, and the second section above the roof of the vehicle when installed; and wherein the center section defines a lengthwise dimension smaller than a lengthwise dimension of the first section and of the second section.

2. The cross bar of claim 1 further comprising:
an aperture located in the center section and configured to receive a fastener for securing the vehicle topper to the cross bar.

3. The cross bar of claim 1 further comprising:
a first receiver configured to be placed on the roof of the vehicle below a distal end of the first section and configured to receive a first fastener for securing the cross bar to the roof; and
a second receiver configured to be placed on the roof of the vehicle below a distal end of the second section and configured to receive a second fastener for securing the cross bar to the roof.

4. The cross bar of claim 3 wherein:
the first receiver is configured to be located in a first rain ditch of the vehicle; and
the second receiver is configured to be located in a second rain ditch of the vehicle.

5. The cross bar of claim 4 further comprising:
a first spacer block configured to be placed in the first rain ditch below the distal end of the first section and above the first receiver; and
a second spacer block configured to be placed in the second rain ditch below the distal end of the second section and above the second receiver.

6. The cross bar of claim 5 wherein:
the first spacer block is sized such that an upper surface of the first spacer block is level to a portion of the roof of the vehicle surrounding the first rain ditch when the first spacer block is installed in the first rain ditch; and
the second spacer block is sized such that an upper surface of the second spacer block is level to a portion of the roof of the vehicle surrounding the second rain ditch when the second spacer block is installed in the second rain ditch.

7. The cross bar of claim 6 further comprising:
a first aperture located in the first spacer block, wherein the first aperture is configured to accommodate the first fastener; and
a second aperture located in the second spacer block, wherein the second aperture is configured to accommodate the second fastener.

8. The cross bar of claim 7 wherein:
the first and second receivers comprise rivet nuts; and
the first and second fasteners comprise threaded shafts.

9. The cross bar of claim 1 wherein:
each of the center section, the first section, and the second section are hollow to accommodate wiring.

10. The cross bar of claim 9 further comprising:
a first wiring aperture located in the center section and configured to permit the wiring to extend from within the center section to the vehicle topper; and
a second wiring aperture located at a distal end of the first section or the second section, wherein said second wiring aperture is configured to permit the wiring to exit the first section or the second section.

11. The cross bar of claim 1 wherein:
the center section, the first section, and the second section are configured to accommodate wiring extending from a power source, through a distal end of the first section or the second section, through the center section, and to the vehicle topper in order to supply electrical power to the vehicle topper.

12. The cross bar of claim 1 wherein:
the first section continuously increases in cross sectional area from a side connected to the center section to a distal end; and
the second section continuously increases in cross sectional area from a side connected to the center section to a distal end.

13. The cross bar of claim 12 wherein:
the first section continuously increases in height from the side connected to the center section to the distal end; and
the second section continuously increases in height from the side connected to the center section to the distal end.

14. The cross bar of claim 1 further comprising:
a first end cap attached to the first end component; and
a second end cap attached to the second end component.

15. The cross bar of claim 14 wherein:
the first end component comprises a first outer plate located at a distal end of the first section, wherein the first outer plate is configured to removably receive the first end cap; and
the second end component comprises a second outer plate located at a distal end of the second section, wherein the second outer plate is configured to removably receive the second end cap.

16. The cross bar of claim 1 wherein:
the center section, the first section, and the second section are configured to accommodate wiring extending from a power source, through a distal end of the first section or the second section, through at least a portion of the center section, and to the vehicle topper in order to supply electrical power to the vehicle topper.

17. A cross bar for mounting a vehicle topper to a roof of a vehicle comprising:
a center section having a rectangular cross section, a first end, and a second end;
a first tapered section having a proximal end extending from the first end of the center section, wherein the first tapered section increases in height from the proximal end of the first tapered section to a distal end of the first tapered section;
a second tapered section having a proximal end extending from the second end of the center section, wherein the second tapered section increases in height from the proximal end of the second tapered section to a distal end of the second tapered section;
a first outer plate located at the distal end of the first tapered section; and
a second outer plate located at the distal end of the second tapered section;
wherein each of the center section, the first tapered section, and the second tapered section extend primarily in a horizontal direction;
wherein each of the first outer plate and the second outer plate extend primarily in a vertical direction and beyond a lower edge of each of the center section, the first tapered section, and the second tapered section to elevate the center section, the first tapered section, and the second tapered section above the roof of the vehicle when said cross bar in installed to said roof of said vehicle.

18. The cross bar of claim 17 wherein:
the center section has length at least as long as the width of the vehicle topper.

19. The cross bar of claim 17 wherein:
an unbroken, hollow passageway is formed along an entire horizontal length of the cross bar.

20. A cross bar for mounting a vehicle topper to a roof of a vehicle comprising:
a center section having a rectangular cross section, a first end, and a second end;
a first tapered section having a proximal end extending from the first end of the center section, wherein the first tapered section continuously increases in height and cross-sectional area from the proximal end of the first tapered section to a distal end of the first tapered section;
a second tapered section having a proximal end extending from the second end of the center section, wherein the second tapered section continuously increases in height and cross-sectional area from the proximal end of the second tapered section to a distal end of the second tapered section;
a first outer plate located at the distal end of the first tapered section; and
a second outer plate located at the distal end of the second tapered section;
wherein the center section, the first tapered section, and the second tapered section extend primarily in a horizontal direction;
wherein the center section, the first tapered section, and the second tapered section form an unbroken, hollow passageway configured to accommodate wiring extending from a power source within the vehicle, through the first or second tapered section, through at least a portion of the center section, and to the vehicle topper;
wherein each of the first outer plate and the second outer plate extend primarily in a vertical direction and beyond a lower edge of each of the center section, the first tapered section, and the second tapered section to elevate the center section, the first tapered section, and the second tapered section above the roof of the vehicle when said cross bar in installed to said roof of said vehicle.

* * * * *